United States Patent
Abad et al.

(10) Patent No.: US 9,962,996 B2
(45) Date of Patent: May 8, 2018

(54) TREAD COMPRISING TREAD PATTERN ELEMENTS COVERED WITH AN IMPREGNATED FIBRE ASSEMBLY

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Vincent Abad, Clermont-Ferrand (FR); Abdeslam El-Harak, Clermont-Ferrand (FR); Frédéric Perrin, Clermont-Ferrand (FR); Masayuki Maesaka, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 537 days.

(21) Appl. No.: 14/365,820

(22) PCT Filed: Dec. 14, 2012

(86) PCT No.: PCT/EP2012/075627
§ 371 (c)(1),
(2) Date: Jun. 16, 2014

(87) PCT Pub. No.: WO2013/087878
PCT Pub. Date: Jun. 20, 2013

(65) Prior Publication Data
US 2014/0311641 A1    Oct. 23, 2014

(30) Foreign Application Priority Data
Dec. 16, 2011   (FR) ...................................... 11 61811

(51) Int. Cl.
*B60C 11/00* (2006.01)
*B60C 1/00* (2006.01)
(Continued)

(52) U.S. Cl.
CPC .......... *B60C 11/005* (2013.01); *B60C 1/0016* (2013.01); *B60C 11/12* (2013.01);
(Continued)

(58) Field of Classification Search
CPC .................................................. B60C 11/1346
See application file for complete search history.

(56) References Cited

U.S. PATENT DOCUMENTS

| 992,052 A | 5/1911 | Phillips |
| 1,714,995 A * | 5/1929 | Wescott ................ A43L 313/04 |
| | | 152/209.4 |

(Continued)

FOREIGN PATENT DOCUMENTS

| CN | 86 1 07950 A | 8/1987 |
| CN | 1061230 A | 5/1992 |

(Continued)

OTHER PUBLICATIONS

Machine translation for Japan 2010-047072 (no date).*
(Continued)

*Primary Examiner* — Steven D Maki
(74) *Attorney, Agent, or Firm* — Fitzpatrick, Cella, Harper & Scinto

(57) ABSTRACT

A tread for a pneumatic tire includes tread pattern elements and cuts. Each tread pattern element includes lateral faces and a contact face that comes into contact with a road surface when the tire is being driven thereon. A boundary between the contact face and the lateral faces forms at least one edge corner. The cuts are formed as grooves and/or sipes, with the cuts being delimited by opposing lateral faces (Continued)

SECTION ON II-II of the tread pattern elements. Each tread pattern element is formed of at least one rubber compound. When the tread is viewed in cross section in a plane normal to an axis of rotation of the tire and passing through a contact face of a tread pattern element, at least one of the cuts adjacent to that contact face is covered at least in part with a covering layer that contains a woven or nonwoven fiber assembly.

33 Claims, 4 Drawing Sheets

(51) Int. Cl.
 *B60C 11/13* (2006.01)
 *B60C 11/12* (2006.01)
 B60C 11/14 (2006.01)
(52) U.S. Cl.
 CPC ... *B60C 11/1346* (2013.01); *B60C 2011/0016* (2013.01); *B60C 2011/145* (2013.01)

(56) References Cited

U.S. PATENT DOCUMENTS

| | | | | |
|---|---|---|---|---|
| 2,513,064 | A * | 6/1950 | Solomon | B60C 9/16 152/211 |
| 2,542,871 | A * | 2/1951 | Johnson | B60C 11/14 152/209.4 |
| 2,690,461 | A * | 9/1954 | Steeves | B60C 11/14 152/211 |
| 2,710,042 | A * | 6/1955 | Gates, Jr. | B29D 30/66 152/209.5 |
| 3,982,578 | A * | 9/1976 | Wild | B60C 9/0007 152/524 |
| 4,946,899 | A | 8/1990 | Kennedy et al. | 525/244 |
| 5,610,240 | A | 3/1997 | Hogt et al. | 525/332.6 |
| 5,614,041 | A * | 3/1997 | Dumke | B60C 11/00 152/209.5 |
| 5,975,173 | A | 11/1999 | Izumoto et al. | 152/209.4 |
| 6,774,255 | B1 | 8/2004 | Tardivat et al. | 556/427 |
| 7,199,175 | B2 | 4/2007 | Vasseur | 524/492 |
| 7,217,751 | B2 | 5/2007 | Durel et al. | 524/262 |
| 7,300,970 | B2 | 11/2007 | Durel et al. | 524/493 |
| 7,311,128 | B2 | 12/2007 | Bruant et al. | 152/209.5 |
| 7,488,768 | B2 | 2/2009 | Tardivat et al. | 524/262 |
| 7,491,767 | B2 | 2/2009 | Durel et al. | 524/492 |
| 7,820,771 | B2 | 10/2010 | Lapra et al. | 525/479 |
| 7,825,183 | B2 | 11/2010 | Robert et al. | 524/476 |
| 7,834,074 | B2 | 11/2010 | Brunelet et al. | 524/318 |
| 8,324,310 | B2 | 12/2012 | Robert et al. | 524/518 |
| 2004/0154719 | A1* | 8/2004 | Zuigyou | B32B 5/02 152/340.1 |
| 2006/0089447 | A1* | 4/2006 | Robertson | B60C 1/00 524/493 |
| 2008/0149260 | A1 | 6/2008 | Orsat | 156/128.6 |
| 2009/0186961 | A1 | 7/2009 | Araujo Da Silva et al. | 523/150 |
| 2009/0209709 | A1 | 8/2009 | Araujo Da Silva et al. | 525/333.1 |
| 2009/0234066 | A1 | 9/2009 | Araujo Da Silva et al. | 524/571 |
| 2009/0270558 | A1 | 10/2009 | Gandon-pain et al. | 525/190 |
| 2010/0154948 | A1* | 6/2010 | Dahlberg | B60C 11/00 152/209.4 |
| 2013/0174952 | A1 | 7/2013 | Abed et al. | 152/209.1 |
| 2014/0051312 | A1 | 2/2014 | Abad et al. | 442/149 |
| 2014/0090548 | A1 | 4/2014 | Abad | 87/6 |

FOREIGN PATENT DOCUMENTS

| | | |
|---|---|---|
| CN | 1646335 A | 7/2005 |
| DE | 1 196 363 | 7/1965 |
| EP | 0 018 539 A1 | 11/1980 |
| EP | 0 320 215 A2 | 6/1989 |
| EP | 0 510 550 A1 | 10/1992 |
| EP | 1 972 223 A1 | 9/2008 |
| EP | 1 982 848 A1 | 10/2008 |
| EP | 2 042 346 A1 | 4/2009 |
| EP | 2 070 728 A1 | 6/2009 |
| FR | 528503 | 11/1921 |
| FR | 2 348 068 A1 | 11/1977 |
| FR | 2348068 A * | 11/1977 |
| FR | 372901 | 4/2007 |
| GB | 1124915 A * | 8/1968 |
| GB | 2 183 205 A | 6/1987 |
| JP | 61-119409 A | 6/1986 |
| JP | H01-153305 A | 6/1989 |
| JP | 07-047814 A * | 2/1995 |
| JP | H07-186616 A | 7/1995 |
| JP | H09-124851 A | 5/1997 |
| JP | 09-193618 A * | 7/1997 |
| JP | H09-193618 A | 7/1997 |
| JP | H11-048708 A | 2/1999 |
| JP | H11-048718 A | 2/1999 |
| JP | 2004-314783 A | 11/2004 |
| JP | 2007-277732 A | 10/2007 |
| JP | 2008-024895 A | 2/2008 |
| JP | 2008-266648 A | 11/2008 |
| JP | 2009-132179 A * | 6/2009 |
| JP | 2010-047072 A * | 3/2010 |
| JP | 2011-236533 A | 11/2011 |
| WO | WO 97/36724 A2 | 10/1997 |
| WO | WO 99/16600 A1 | 4/1999 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 03/016837 A1 | 2/2003 |
| WO | WO 03/089257 A1 | 10/2003 |
| WO | WO 2005/085332 A1 | 9/2005 |
| WO | WO 2005/087859 A1 | 9/2005 |
| WO | WO 2006/061064 A1 | 6/2006 |
| WO | WO 2006/069792 A1 | 7/2006 |
| WO | WO 2006/069793 A1 | 7/2006 |
| WO | WO 2006/069912 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/017060 A1 | 2/2007 |

OTHER PUBLICATIONS

Machine translation for Japan 2009-132179 (no date).*
Machine translation for Japan 09-193618 (no date).*
Partial translation for Japan 09-193618 (no date).*
Machine translation for France 2,348,068 (no date).*
Machine translation for Japan 07-047814 (Year: 2017).*
SIPO communication dated Jun. 20, 2016, in connection with Chinese Application No. 201280061829.1 (in Chinese with English translation attached).
Z. Fodor et al., "Polyisobutylene-containing block polymers by sequential monomer addition," Polymer Bulletin, vol. 29, pp. 697-704 (1992).
J.E. Puskas et al., "Polyisobutylene-Containing Block Polymers by Sequential Monomer Addition. IV. New Triblock Thermopolastic Elastomers Comprising High $T_9$ Styrenic Glassy Segments: Synthesis, Characterization and Physical Properties," Journal of Polymer Science: Part A: Polymer Chemistry, vol. 30, pp. 41-48 (1992).
J.P. Kennedy et al., "Polyisobutylene-Containing Block Copolymers by Sequential Monomer Addition. 5. Synthesis, Characterization, and Select Properties of Poly (p-tert-butylstyrene-b-isobutylene-b-p-tert-butylstyrene)," Macromolecules, vol. 24, pp. 6572-6577 (1991).
G. Kaszas et al., "New Thermoplastic Elastomers of Rubbery Polyisobutylene and Glassy Cyclopolyisoprene Segments," Journal of Applied Polymer Science, vol. 39, pp. 119-144 (1990).
J.E. Puskas et al., "New Transparent Flexible UV-Cured Films from Polyisobutylene-Polyisoprene Block Polymers," Journal of Macromolecular Science—Chemistry, vol. A28(1), pp. 65-80 (1991).

(56) References Cited

OTHER PUBLICATIONS

U.S. Appl. No. 14/365,697, filed Dec. 14, 2012.
U.S. Appl. No. 14/365,703, filed Dec. 14, 2012.
L. Busse et al., "Modelling of Dry and Wet Friction of Silica Filled Elastomers on Self-Affine Road Surfaces," Elastomer Friction: Theory, Experiment and Simulation, LNACM, vol. 51, Springer-Verlag, pp. 1-26 (2010).
S. Ella et al., "Investigation of rubber friction on snow for tyres," 38th Leeds-Lyon Symposium on Tribology, Lyon, France, Sep. 6-9, 2011, Tribology International, vol. 59, pp. 292-301 (Mar. 2013).
English translation of SIPO communication dated Dec. 3, 2015, in connection with Chinese Application No. 201280061829.1.
SIPO communication dated Dec. 3, 2015, in connection with Chinese Application No. 201280061829.1 (in Chinese).
Notification of Reason for Rejection dated Sep. 14, 2016, which was issued by the JPO in connection with Japanese Application No. 2014-546544 (in Japanese with English translation attached).

\* cited by examiner

SECTION ON II-II

TREAD COMPRISING TREAD PATTERN ELEMENTS COVERED WITH AN IMPREGNATED FIBRE ASSEMBLY

FIELD OF THE INVENTION

The invention relates to tyres and more particularly to the tread of such tyres.

PRIOR ART

In order to obtain satisfactory driving performance particularly on wet road surfaces, it is known practice to provide a tyre tread with a tread pattern formed by tread pattern elements separated from one another by cuts (grooves with an average width of greater than or equal to 2 mm and/or sipes with an average width of less than 2 mm), these cuts being obtained for example by moulding. The tread pattern elements thus formed comprise a contact face intended to come into contact with the road surface during driving and lateral faces also delimiting the cuts; the intersection of each lateral face with the contact face forms an edge corner facilitating contact between the tyre and the road surface, notably when the road surface is wet. More generally, an edge corner is defined as being the geometric boundary of the contact of a tread pattern element with the ground during driving.

With tread pattern elements a distinction is made between elements that do not go all the way around the tyre (blocks) and elements that do go all around the tyre (ribs). Moreover, the tread pattern elements may comprise one or more sipes to form additional edge corners, it being possible for each sipe to open or not to open onto at least one lateral face of the tread pattern element. By definition, a sipe is the space delimited by two opposing main faces that are distant from one another by a width of less than 2 mm.

To improve the grip of the tyre on a wet road surface, it is known that the very nature of the rubber compound (also referred to as rubber composition) of which the tread is made has an appreciable impact. Thus, a tyre tread made of a rubber compound that has better grip on wet ground makes it possible to obtain improved performance when driving in wet conditions. However, this improvement in wet grip performance as a general rule comes hand in hand with a drop in wearing performance on dry road surfaces, resulting in a shorter wear life and the need to change the tyres on a vehicle more often.

The applicant companies' document WO 03/089257 discloses a tread for a pneumatic tyre, comprising:
 a plurality of tread pattern elements comprising lateral faces and a contact face which is intended to come into contact with the road surface when a tyre provided with the said tread is being driven on, the limit of the contact between the contact face and the ground forming at least one edge corner;
 a plurality of cuts in the form of grooves and/or sipes, the said cuts being delimited by opposing lateral faces;
 each tread pattern element being formed with at least one first rubber compound referred to as a base compound;
 the said tread having, viewed in cross section in a plane containing the thickness of the said tread, at least one face delimiting at least one cut covered at least in part with a covering layer. This tread is such that the base compound has wet grip that is inferior to the grip of the material of the covering layer on the same ground.

This tread allows an appreciable improvement in the wet weather performance of pneumatic tyres equipped therewith.

One way of manufacturing this tread is notably disclosed in document WO 2006/069912. According to this method of manufacture, provision is made for the covering material to be injected in the form of one or more inserts into the green tyre using an injection nozzle. The insert or inserts is or are then shaped, in a second step, by the bars of a vulcanizing mould, so that all or part of the walls of the grooves moulded by these bars are covered.

This method of manufacture has a number of limitations, particularly in terms of obtaining precision mouldings. Specifically, while it is being formed, the insert experiences substantial shear force from the bar seeking to convert this insert into a layer of lesser thickness. This shear force may generate cracks within the insert making it more difficult to control the movements of the material of which this insert is made. The shape and thickness of the layer of covering material thus formed may therefore vary randomly. The advantages afforded by the additional layer to the operation of the tyre are then reduced.

In addition, in this embodiment, it is necessary to make the inserts align with the bars. This then makes the manufacture of the tread more complicated.

There is therefore a need to improve the placement of a layer of a covering material on the walls of cuts in a tyre tread.

Definitions

"Tyre" or "pneumatic tyre" means all types of elastic tyre whether or not subjected to an internal pressure.

"Green tyre" means a superposition of a plurality of semi-finished rubber products present in the form of strips or sheets, which may or may not be reinforced. The green tyre is intended to be vulcanized in a mould in order to obtain the tyre.

The "tread" of a tyre means a quantity of rubbery material delimited by lateral surfaces and by two main surfaces one of which is intended to come into contact with a road surface when the tyre is being driven on.

A "tread surface" means the surface formed by those points of the tread of the tyre which come into contact with the road surface when the tyre is being driven on.

A "tread pattern element" means elements of the tread which are delimited by cuts, i.e. grooves and/or sipes. Among tread pattern elements a distinction is made between ribs, which go all around the tyre, and blocks which do not go all around the tyre.

A "mould" means a collection of separate moulding elements which, when brought closer together, delimit a toroidal moulding space.

A "moulding surface" of a mould means the surface of the mould that is intended to mould the tread surface of the tyre.

A "blade" of a moulding element means a protrusion projecting from the moulding surface. Among blades, a distinction is made between sipe blades which have a width of less than 2 mm and bars which have a width greater than or equal to 2 mm. The sipe blades are intended to mould sipes in the tread of the tyre, i.e. cuts which close up in the contact patch in which the tyre is in contact with the ground. The bars are intended to mould grooves in the tread, i.e. cuts which do not close up in the contact patch in which the tyre is in contact with the ground.

A "moulding step" means an operation which begins at the moment the blade comes into contact with the material covering the green tyre. This operation ends the moment this blade leaves the cut that it has moulded.

BRIEF DESCRIPTION OF THE INVENTION

The subject of the invention is a tread similar to that of document WO 03/089257 in which, viewed in cross section in a plane normal to the axis of rotation of the pneumatic tyre and passing through at least one contact face of a tread pattern element, at least one of the cuts adjacent to the contact face is covered at least in part with a covering layer, and in which the covering layer contains a woven or nonwoven fibre assembly.

The presence of this, woven or nonwoven, fibre assembly makes it possible, because of its intrinsic rigidity, for the layer of covering material to be placed easily and with great precision in the cuts of the tread pattern of the tread.

These cuts thus covered are preferably normal to the circumferential direction of the pneumatic tyre or have an orientation having a component normal to the circumferential direction of the pneumatic tyre.

The presence of the covering layer with such an orientation of the cut makes it possible to improve the grip of the pneumatic tyre, particularly on snowy roads.

For preference, with the covering layer containing an elastomeric material, the fibre assembly is impregnated with the elastomeric material of the covering layer.

A "woven or nonwoven fibre assembly impregnated with an elastomeric material" means any two-dimensional or three-dimensional fibre assembly impregnated, after it has been formed, with an elastomeric material. In particular, a rubbery composition containing fibres produced by kneading then shaping of all of the constituents of the composition is excluded from this definition.

For preference, the fibre assemblies use long fibres assembled by weaving or nonwovens. Long fibres means fibres the longest dimension of which is greater than 50 mm.

The presence of such a fibre assembly impregnated with the elastomeric material of the covering layer makes it possible to obtain excellent cohesion of the covering layer before the green tyre is vulcanized and thus makes this covering layer easier to place at the time of the moulding of the pneumatic tyre.

According to one first embodiment, the fibre assembly is a two-dimensional fibre assembly, such as a woven or a nonwoven.

According to another embodiment, the fibre assembly is a three-dimensional fibre assembly, such as a felt.

The fibres of the fibre assembly may be selected from the group of textile fibres, mineral fibres and blends thereof.

A great many types of fibre may be used to give the fibre assembly and therefore the covering layer sufficient tensile rigidity to make placement of this covering layer when moulding the green tyre easier.

For preference, the apparent density of the fibre assembly prior to impregnation with an elastomeric material is less than 0.4 and preferably less than 0.25.

This low initial density of the fibre assembly makes it possible to achieve excellent impregnation with the elastomeric material, which impregnation is performed, for example, hot and under pressure, by calendering or moulding in a press for example.

According to one advantageous embodiment, the elastomeric material of the covering layer is a composition based on at least one diene elastomer.

According to one particular embodiment, the composition based on a diene elastomer is highly filled with sulphur. For preference, the sulphur content is higher than 20 parts per hundred rubber.

Such a material of the covering layer makes it possible to obtain a covering layer with very high rigidity, something which promotes grip on snowy ground.

According to another embodiment, the elastomeric material of the covering layer is based on at least one thermoplastic elastomer, the said thermoplastic elastomer being a block copolymer comprising at least one elastomer block and at least one thermoplastic block.

The use of a thermoplastic elastomer means that the fibre assembly can be impregnated under excellent conditions by moulding the elastomeric material over the fibre assembly in a press or by injection moulding, again in the hot state, above the melting point or softening temperature of the thermoplastic elastomers.

According to a preferred embodiment, the dynamic shear modulus $G^*$ of the elastomeric material of the covering layer subjected to an alternating maximum stress of 0.7 MPa, at a frequency of 10 Hz and at a temperature of $-10°$ C. is greater than 100 MPa and preferably greater than 200 MPa.

This material with a very high modulus at low temperature makes it possible to create a covering layer of high rigidity which promotes grip on snow.

For preference, the thickness of the covering layer is comprised between 0.1 and 3.5 mm.

According to one particular embodiment, this thickness is comprised between 0.4 and 1.0 mm, as that makes it possible to maintain an excellent behaviour on snowy ground while at the same time limiting the extent to which grip on icy ground is penalized.

According to another particular embodiment, this thickness is comprised between 2.0 and 3.0 mm. This thickness is highly beneficial in improving the compromise between wet grip and snow grip.

For preference, the covering material extends, from the bottom of the cut, over a height Hr at least equal to 4 mm.

That makes it possible, when the height Hr is close to 4 mm, to improve behaviour on snowy ground through the action of the very rigid covering layer. Indeed it is known that tyres specializing in grip on snowy ground see a drop-off in their performance when the residual thickness of the tread pattern elements becomes close to 4 mm and below. For such tyres, this embodiment prolongs their intrinsic qualities even with a low tread pattern element height.

According to another advantageous embodiment, the covering layer extends, in the new condition, as far as the edge corner formed by the boundary between the contact face and the lateral face of the tread pattern element.

In this embodiment, the properties of the covering layer are used right from the first few kilometers travelled.

All of the treads for pneumatic tyres described hereinabove can be produced notably using the method set out in document EP 0510550.

However, this set of treads is particularly well suited to being produced using the method which is now described.

This method of manufacture involves a step of preparing a green tyre, a step of placing a covering layer comprising a woven or nonwoven fibre assembly over all or part of an external surface of the green tyre, a step of placing the green tyre in a mould, this mould comprising a blade, a step of moulding a lateral face of a tread pattern element using this blade and a step of vulcanizing the green tyre to obtain the finished tyre. The method of manufacture also involves a step of cutting the covering layer into a plurality of parts of the same thickness and, during the moulding of the lateral face of the tread pattern element by the blade, a step wherein this blade drives one or more of the parts of the covering layer into the green tyre. For preference, this step of cutting the covering layer is performed during the moulding of the lateral face of the tread pattern element.

Using the method of manufacture of the invention, the covering layer finds itself positioned under the blade and the area of contact of the blade with this layer at the time of moulding is great. Thus, during this moulding, the covering layer is driven by the blade into the thickness of the green tyre and is not deformed by a sharp corner of the mould as it was in the prior art. Because of the intrinsic tensile rigidity of the fibre assembly, the covering layer is deformed only very little during this driving step in the moulding of the green tyre.

The invention relates particularly to the pneumatic tyres intended to be fitted to motor vehicles of the passenger car, SUV ("Sport Utility Vehicle"), two-wheeled (in particular motorcycle) and aeroplane type, and to industrial vehicles selected from vans, heavy vehicles—i.e. metro, bus, road transport vehicles (lorries, tractors, trailers), off-road vehicles such as agricultural or construction plant machinery—and other transport or handling vehicles.

BRIEF DESCRIPTION OF THE DRAWINGS

Other features and advantages of the invention will become apparent from the following description, given by way of nonlimiting example, with reference to the attached drawings in which.

DETAILED DESCRIPTION OF THE INVENTION

In the present description, unless expressly indicated otherwise, all percentages (%) indicated are wt %.

Moreover, any range of values denoted by the expression "between a and b" represents the range of values extending from more than a to less than b (i.e. excluding the end points a and b), whereas any range of values denoted by the expression "from a to b" means the range of values extending from a up to b (i.e. including the strict end points a and b).

I. Tests

A. Coefficient of Friction Measured on Test Specimens

The friction tests were carried out with a linear tribometer according to the method described in the article entitled "Investigation of rubber friction on snow for tyres" written by Sam Ella, Pierre-Yves Formagne, Vasileios Koutsos and Jane R. Blackford (38th LEEDS-Lyons Symposium on tribology, Lyons, 6-9 Sep. 2011).

The parameters of the test are the speed equal to 0.5 ms$^{-1}$ and a load of 0.82 kN. The stabilized speed is reached with an acceleration of 5 ms$^{-2}$.

Figure 3:
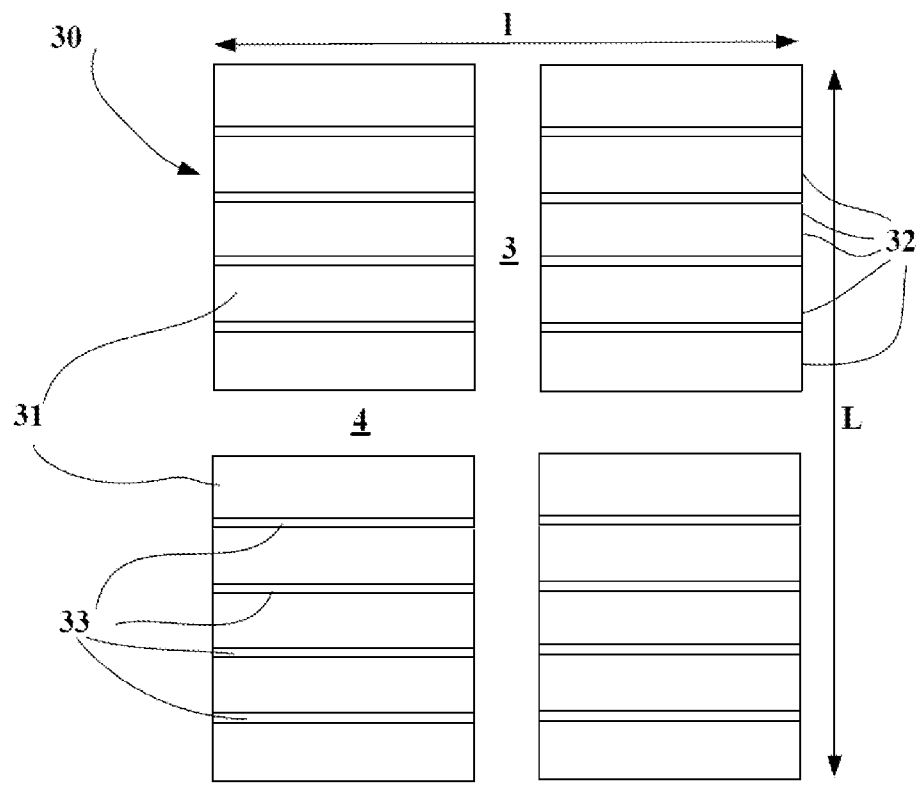
FIG. 3 shows a plan view of a test specimen for a friction test on snow.

The test specimen 30 used is shown in the appended FIGS. 3 (view from above) and 4 (view from the side). This test specimen is made up of four blocks 31 of rubber compound moulded on a parallelepipedal rubbery support 34 (of length L=60 mm, width l=56 mm and thickness 2 mm).

The blocks of width $L_1$ equal to 25 mm and length $L_2$ equal to 27 mm are separated by a longitudinal groove 3 and a transverse groove 4, both of the order of 6 mm wide. Each block 31 comprises four sipes 33 of axial orientation Y open on each side of the block and 0.6 mm thick each dividing the block 31 into five equal parts 32. The height of the blocks is 9 mm. The test specimen is moved in the longitudinal direction X, normal to the axial orientation Y of the sipes.

Tests were carried out on a track of length 110 mm, covered with compact artificial snow at a temperature of −10° C.

The load and the tangential force are recorded as the portion of tread moves horizontally. The coefficient of friction is then calculated, this being obtained by dividing the mean value of the tangential force by the load applied to the first 30 millimeters of the travel.

B. Dynamic Mechanical Measurements

In this document, "elastic modulus G'" and "viscous modulus G''" denote dynamic properties well known to those skilled in the art. These properties are measured on a Metravib VA4000 type viscoanalyzer on test specimens moulded from unvulcanized compositions. Test specimens such as those described in the standard ASTM D 5992-96 (the version published in September 2006, initially approved in 1996), Figure X2.1 (circular embodiment) are used. The diameter "d" of the test specimen is 10 mm (so it therefore has a circular cross section of 78.5 mm$^2$), the thickness "L" of each of the portions of rubber composition is 2 mm, which gives a "d/L" ratio of 5 (unlike in the ISO to standard 2856 mentioned in the ASTM standard at paragraph X2.4 which recommends a d/L value of 2).

The response of a test specimen of vulcanized rubber composition subjected to simple alternating sinusoidal shear stresses at a frequency of 10 Hz is recorded. The test specimen is shear loaded sinusoidally at 10 Hz, with an imposed stress (0.7 MPa), symmetrically about its equilibrium position.

The test specimen undergoes an accommodation cycle prior to measurement. The test specimen is then shear loaded sinusoidally at 10 Hz, at 100% deformation peak-peak, at ambient temperature.

The measurements are taken as the temperature increases at a gradient of 1.5° C. per minute, from a temperature Tmin below the glass transition temperature (Tg) of the material, up to a temperature Tmax which may correspond to the rubber plateau of the material. Before the sweep is begun, the test specimen is stabilized at the temperature Tmin for 20 minutes in order to have a uniform temperature within the test specimen. The result exploited is the dynamic shear modulus of elasticity (G') and the viscous shear modulus (G") at the chosen temperatures (in this instance, 0°, 5° and 20° C.).

The "complex modulus" G* is defined as being the absolute value of the complex sum of the elastic modulus G' and viscous modulus G":

$$G^* = \sqrt{(G'^2 + G''^2)}$$

II. Covering Layer

A. Fibre Assembly

An essential element in the collection of covering layers according to one aspect of the invention is that it should contain a woven or nonwoven fibre assembly.

What is meant by a woven or nonwoven fibre assembly is any manufactured product consisting of a web, a lap or a mat of fibres, whether these are distributed directionally or at random, and the fibres of which are interlaced or entangled two dimensionally or three dimensionally in the case of nonwovens or woven in the case of wovens.

Because of the intrinsic rigidity of this woven or nonwoven fibre assembly, it allows the layer of covering material to be placed easily and with great precision in the cuts of the tread pattern of the tread.

According to one first embodiment, the fibre assembly is a two-dimensional fibre assembly such as a woven or a nonwoven.

According to another embodiment, the fibre assembly is a three-dimensional fibre assembly such as a felt.

The fibres of the fibre assembly may be selected from the group of textile fibres, mineral fibres and blends thereof.

There are a great many types of fibre that can be used to give the fibre assembly, and therefore the covering layer, sufficient tensile rigidity that this covering layer can be put in place easily at the time of the moulding of the green tyre.

The methods of manufacturing such woven or nonwoven fibre assemblies are well known, notably including needling or fulling in the case of three-dimensional assemblies such as felts.

The fibres of the felt may be selected from textile fibres of natural origin, for example from the group of silk, cotton, bamboo, cellulose, wool fibres and blends thereof.

Examples of wool felts are the "PLB" and "MLB" felts by the Laoureux company. These felts are marketed with an apparent density varying between 0.20 and 0.44.

The fibres of the felt may also be selected from the group of synthetic textile fibres, for example polyester, polyamide, carbon, aramid, polyethylene, polypropylene, polyacrylonitrile, polyimide, polysulfone, polyether sulfone, polyurethane, polyvinyl alcohol fibres and blends thereof.

The polyester fibres of the felt may advantageously be selected from the group of polyethylene terephthalate (PET—Dacron Invista inc.), polybutylene terephthalate (PBT), polyethylene naphthalate (PEN) fibres, and blends thereof.

By way of example of felts made of aramid fibres, mention may be made of the felts produced using Nomex® fibres (meta-aramid fibres: poly(m-phenyleneisophtalamide), of symbol MPD-I) by the Du Pont de Nemours company.

The fibres of the felt may also be selected from the group of mineral fibres, for example glass and basalt fibres.

The felts may, without indicating any preference, be made up of several types of fibres from one and the same group or from different groups as previously described.

For preference, the apparent density of the fibre assembly prior to impregnation with an elastomeric material is less than 0.4 and preferably less than 0.30.

This low apparent density is intended to yield excellent impregnation of the fibre assembly with the elastomeric material of the covering layer.

B. Elastomeric Material of the Covering Layer

1. Diene Blend

According to one essential feature of the invention, the fibre assemblies used in the covering layer of a lateral face of a tread pattern element of the tread are impregnated with an elastomeric material.

A "woven or nonwoven fibre assembly impregnated with an elastomeric material" means any two-dimensional or three-dimensional fibre assembly impregnated, after it has been formed, with an elastomeric material. In particular, a rubbery composition containing fibres produced by kneading then shaping of all of the constituents of the composition is excluded from this definition.

The presence of such a fibre assembly impregnated with the elastomeric material of the covering layer makes it possible to achieve excellent cohesion of the covering layer while it is being manufactured and thus makes this covering layer easier to place during the moulding of the pneumatic tyre.

According to one first embodiment, the fibre assemblies used are impregnated with an elastomeric material based on a diene elastomer.

a) Diene Elastomer

A "diene" elastomer or rubber is to be understood as meaning, in the known way, one (which means one or more) elastomer derived at least in part (i.e. a homopolymer or a copolymer) from diene monomers (monomers bearing two carbon-carbon double bonds, conjugated or unconjugated).

The diene elastomer of the elastomeric material is preferably selected from the group of highly unsaturated diene elastomers consisting of polybutadienes (BR), synthetic polyisoprenes (IR), natural rubber (NR), butadiene copolymers, isoprene copolymers and blends of these elastomers. Such copolymers are more preferably selected from the group consisting of butadiene-styrene copolymers (SBR), isoprene-butadiene copolymers (BIR), isoprene-styrene copolymers (SIR), and isoprene-butadiene-styrene copolymers (SBIR).

Polybutadienes having a content (mol %) of -1,2 units comprised between 4% and 80% or those having a content (mol %) of cis-1,4 higher than 80%, polyisoprenes, butadiene-styrene copolymers and, particularly, those having a Tg (glass transition temperature, measured in accordance with ASTM D3418) between 0° C. and −70° C. and more particularly between −10° C. and −60° C., a styrene content comprised between 5 wt % and 60 wt % and more particularly between 20% and 50%, a content (mol %) of -1,2 bonds in the butadiene part comprised between 4% and 75%, a content (mol %) of trans-1,4 bonds comprised between 10% and 80%, butadiene-isoprene copolymers notably those having an isoprene content comprised between 5 wt % and 90 wt % and a Tg from −40° C. to −80° C., isoprene-styrene copolymers and notably those having a styrene content comprised between 5 wt % and 50 wt % and a Tg comprised between −25° C. and −50° C. are notably suitable.

In the case of butadiene-styrene-isoprene copolymers, those having a styrene content comprised between 5 wt % and 50 wt % and more particularly comprised between 10% and 40%, an isoprene content comprised between 15 wt % and 60 wt % and more particularly between 20% and 50%, a butadiene content comprised between 5 wt % and 50 wt % and more particularly comprised between 20% and 40%, a content (mol %) in -1,2 units of the butadiene part comprised between 4% and 85%, a content (mol %) in trans-1,4 units of the butadiene part comprised between 6% and 80%, a content (mol %) in -1,2 plus-3,4 units of the isoprene part comprised between 5% and 70%, and a content (mol %) in trans-1,4 units of the isoprene part comprised between 10% and 50%, and more generally any butadiene-styrene-isoprene copolymer having a Tg comprised between –20° C. and –70° C. are notably suitable.

According to one particular embodiment, the diene elastomer is predominantly (i.e. in respect of over 50 phr), an SBR, whether this be an emulsion SBR ("ESBR") or a solution SBR ("SSBR"), or a cut (blend) of SBR/BR, SBR/NR (or SBR/IR), BR/NR (or BR/IR) or even SBR/BR/NR (or SBR/BR/IR). In the case of an SBR (ESBR or SSBR) elastomer, use is notably made of an SBR having a mean styrene content for example comprised between 20 wt % and 35 wt %, or a high styrene content, for example of 35 to 45%, a content in vinyl bonds in the butadiene part comprised between 15% and 70%, a content (mol %) in trans-1,4 bonds comprised between 15% and 75% and a Tg comprised between –10° C. and –55° C.; such an SBR may advantageously be used in a blend with a BR that preferably possesses more than 90% (mol %) of cis-1,4 bonds.

According to another particular embodiment, the diene elastomer is predominantly (in respect of over 50 phr) an isoprene elastomer. An "isoprene elastomer" means, in the known way, a homopolymer or copolymer of isoprene, or in other words a diene elastomer selected from the group consisting of natural rubber (NR), synthetic polyisoprenes (IR), the various copolymers of isoprene and blends of these elastomers. Of isoprene copolymers, particular mention will be made of isobutene-isoprene (butyl rubber—IIR), isoprene-styrene (SIR), isoprene-butadiene (BIR) or isoprene-butadiene-styrene (SBIR) copolymers. This isoprene elastomer is preferably natural rubber or a synthetic cis-1,4 polyisoprene; of these synthetic polyisoprenes, use is preferably made of polyisoprenes having a content (mol %) of cis-1,4 bonds higher than 90%, more preferably still, higher than 98%.

According to another preferred embodiment of the invention, the elastomeric material contains a cut of one (one or more) so-called "high Tg" diene elastomer having a Tg comprised between –70° C. and 0° C. and one (one or more) so-called "low Tg" diene elastomer with a Tg comprised between –110° C. and –80° C., more preferably between –105° C. and –90° C. The high-Tg elastomer is preferably selected from the group consisting of S-SBRs, E-SBRs, natural rubbers, synthetic polyisoprenes (having a content (mol %) of cis-1,4 sequences preferably higher than 95%), BIRs, SIRs, SBIRs and blends of these elastomers. The low-Tg elastomer preferably comprises butadiene units at a content (mol %) at least equal to 70%; it preferably consists of a polybutadiene (BR) having a content (mol %) of cis-1,4 sequences higher than 90%.

According to another particular embodiment of the invention, the composition of the elastomeric material comprises for example from 30 to 100 phr, particularly from 50 to 100 phr of a high-Tg elastomer cut with 0 to 70 phr, particularly from 0 to 50 phr, of a low-Tg elastomer; according to another example, all 100 phr are represented by one or more solution SBR(s).

According to another particular embodiment of the invention, the diene elastomer of the elastomeric composition comprises a cut of a BR (by way of low-Tg elastomer) having a content (mol %) of cis-1,4 sequences higher than 90%, with one or more S-SBR(s) or E-SBR(s) (by way of high-Tg elastomer(s)).

The compositions formulated according to the invention may contain a single diene elastomer or a blend of several diene elastomers, it being possible for the diene elastomer or elastomers to be used in combination with any type of synthetic elastomer other than a diene elastomer, or even with polymers other than elastomers, for example thermoplastic polymers.

(1) Nanometric or Reinforcing Filler

Use may be made of any type of reinforcing filler known for its abilities to reinforce a rubber composition that can be used for the manufacture of tyre treads, for example an organic filler such as carbon black, a reinforcing inorganic filler such as silica, or even a cut of these two types of filler, notably a cut of carbon black and silica.

Suitable carbon blacks include all carbon blacks, notably the blacks usually used in tyre treads (blacks referred to as tyre grade). Of these, more particular mention will be made of the reinforcing carbon blacks of series 100, 200 or 300 (ASTM grades), such as blacks N115, N134, N234, N326, N330, N339, N347, N375 for example or even, depending on the intended application, blacks of higher series (for example N660, N683, N772). The carbon blacks may for example already be incorporated into the isoprene elastomer in the form of a masterbatch (see, for example, applications WO 97/36724 or WO 99/16600).

As examples of organic fillers other than carbon blacks, mention may be made of the functionalized polyvinylaromatic organic fillers such as those described in applications WO-A-2006/069792 and WO-A-2006/069793.

A "reinforcing inorganic filler" is to be understood in the present application to mean, by definition, any inorganic or mineral filler (whatever its colour and origin (natural or synthetic), also referred to as "white" filler, "clear" filler or even "non-black filler", as opposed to carbon black, capable on its own, with no additional means other than an intermediate coupling agent, of reinforcing a rubber composition intended for the manufacture of tyres, or in other words able, in its reinforcing function, to replace a conventional tyre grade carbon black; such a filler is generally, as is known, characterized by the presence of hydroxyl (—OH) groups at its surface.

The physical form that the reinforcing inorganic filler adopts can be any, whether it be in the form of powder, microbeads, granules, beads or any other suitable densified form. Of course, a reinforcing inorganic filler also covers blends of various reinforcing inorganic fillers, particularly highly dispersible aluminous and/or siliceous fillers as described hereinafter.

By way of reinforcing inorganic fillers, mineral fillers of the siliceous type, particularly silica ($SiO_2$), or of the aluminous type, particularly alumina ($Al_2O_3$) are notably suitable. The silica used may be any reinforcing silica known to those skilled in the art, notably any precipitated or pyrogenated silica having a BET surface area and a CTAB specific surface area both less than 450 $m^2/g$, preferably from 30 to 400 $m^2/g$. By way of highly dispersible precipitated silicas (referred to as "HDS"), mention will be made for example of the Ultrasil 7000 and Ultrasil 7005 silicas by the Degussa company, the Zeosil 1165 MP, 1135 MP and 1115 MP silicas of the Rhodia company, the Hi-Sil EZ150G silica of the PPG company, the Zeopol 8715, 8745 and 8755 silicas of the Huber company, and high specific surface area silicas as described in application WO 03/16837.

The reinforcing inorganic filler used, particularly when it is a silica, preferably has a BET surface area comprised between 45 and 400 $m^2/g$, more preferably comprised between 60 and 300 $m^2/g$.

For preference, for the elastomeric material, the total reinforcing filler content (carbon black and/or reinforcing inorganic filler such as silica) is greater than 30 phr and preferably comprised between 40 and 100 phr; that allows the elastomeric material to be given good resistance to cracking while at the same time maintaining low hysteresis.

For preference, the mean size (by mass) of the nanoparticles is comprised between 20 and 200 nm, more preferably between 20 and 150 nm.

In order to couple the reinforcing inorganic filler with the diene elastomer use is made in the known way of a coupling agent (or bonding agent), at least a bifunctional one, intended to provide sufficient chemical and/or physical connection between the inorganic filler (surface of the particles thereof) and the diene elastomer, particularly organosilanes or bifunctional polyorganosiloxanes.

Use is notably made of polysulphide silanes referred to as "symmetric" or "asymmetric" according to their particular structure, like those described for example in applications WO03/002648 (or US 2005/016651) and WO03/002649 (or US 2005/016650).

Polysulphide silanes that are particularly suitable, without the definition hereinbelow being limiting, are so-called "symmetric" ones corresponding to the following general formula (I):

x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$, notably $C_1$-$C_4$, alkylenes, particularly propylene);
Z corresponds to one of the following formulae:

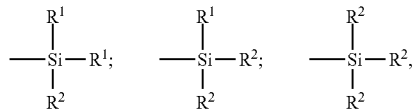

in which:
the radicals $R^1$, which may be substituted or unsubstituted, identical to or different from one another, represent a $C_1$-$C_{18}$ alkyl group, $C_5$-$C_{18}$ cycloalkyl group, or $C_6$-$C_{18}$ aryl group (preferably $C_1$-$C_6$ alkyl, cyclohexyl or phenyl groups, notably $C_1$-$C_4$ alkyl groups, more particularly methyl and/or ethyl);
the radicals $R^2$, which may be substituted or unsubstituted, identical to or different from one another, represent a $C_1$-$C_{18}$ alkoxyl, or $C_5$-$C_{18}$ cycloalkoxyl group (preferably a group selected from $C_1$-$C_8$ alkoxyls and $C_5$-$C_8$ cycloalkoxyl, more preferably still a group selected from $C_1$-$C_4$ alkoxyls, particularly methoxyl and ethoxyl groups).

By way of examples of polysulphide silanes, more particular mention will be made of bis(3-trimethoxysilylpropyl) or bis(3-triethoxysilylpropyl) polysulphides. Of these compounds, particular use will be made of bis(3-triethoxysilylpropyl) tetrasulphide, or TESPT for short, or bis-(triethoxysilylpropyl) disulphide, or TESPD for short. By way of preferred examples mention will also be made of bis-(monoalkoxy)($C_1$-$C_4$)-dialkyl($C_1$-$C_4$)silylpropyl) polysulphides (notably disulphides, trisulphides or tetrasulphides), more particularly bis-monoethoxydimethylsilylpropyl tetrasulphide, as described in patent application WO 02/083782 (or US 2004/132880).

By way of a coupling agent other than a polysulphide alkoxysilane, mention will particularly be made of bifunctional POSs (polyorganosiloxanes) or even hydroxysilane polysulphides ($R^2$=OH in formula I above) as described in patent applications WO 02/30939 (or U.S. Pat. No. 6,774, 255) and WO 02/31041 (or US 2004/051210) or even of silanes or POSs bearing azo-dicarbonyl functional groups such as those described for example in patent applications WO 2006/125532, WO 2006/125533, WO 2006/125534.

In the elastomeric material compositions according to one subject matter of the invention, the coupling agent content is preferably comprised between 3 and 12 phr, more preferably between 4 and 9 phr.

A person skilled in the art will understand that by way of filler equivalent to the reinforcing inorganic filler described in this paragraph it might be possible to use a reinforcing filler of a different nature, notably an organic one, provided that this reinforcing filler is covered with an inorganic layer such as silica or alternatively provided that it comprises at its surface functional sites, notably hydroxyl sites, requiring the use of a coupling agent in order to establish the bond between the filler and the elastomer.

(2) Various Additives

The composition of the elastomeric material may also include all or some of the usual additives conventionally used in elastomer compositions intended for tyre manufacture, such as, for example, pigments, protective agents such as antiozonant wax, chemical antiozonants, antioxidants, antifatigue agents, reinforcing resins, acceptors (for example novolac phenolic resin) or donors (for example HMT or H3M) of methylene, such as those described for example in application WO 02/10269, a crosslinking system based either on sulphur or on sulphur donors and/or peroxide and/or bismaleimides, vulcanization accelerators, vulcanization activators.

The formulation of the elastomeric material may also in addition contain coupling agents, coupling activators, agents for covering the inorganic fillers or, more generally, agents that assist with workability, capable, in the known way, by improving the dispersion of the filler in the rubber matrix and by lowering the viscosity of the compositions, of making these easier to work in the raw state, these agents for example being hydrolyzable silanes such as alkylalkoxysilanes, polyols, polyethers, primary, secondary or tertiary amines, hydroxylated or hydrolyzable polyorganosiloxanes.

The elastomeric material may also contain, by way of preferred nonaromatic or only weakly aromatic plasticizer, at least one compound selected from the group consisting of naphthene oils, paraffin oils, MES oils, TDAE oils, ester plasticizers (for example glycerol trioleates), hydrocarbon resins having a high Tg, preferably above 30° C., such as described for example in applications WO 2005/087859, WO 2006/061064 and WO 2007/017060, and blends of such compounds. The overall content of such a preferred plasticizer is preferably comprised between 10 and 100 phr, more preferably comprised between 20 and 80 phr, notably in a range from 10 to 50 phr.

Of the hydrocarbon plasticizing resins mentioned hereinabove (it will be recalled that the term "resin" is reserved by definition for a solid compound), notable mention will be made of resins that are a homo- or copolymers of alphapinene, betapinene, dipentene or polylimonene, cut C5, for example cut C5/styrene copolymer or cut C5/cut C9 copolymer, which can be used alone or in combination with plasticizing oils such as MES or TDAE oils for example.

(3) Ebonite

According to one particular embodiment of the elastomeric material of the covering layer, use is made of a composition based on at least one diene elastomer which is very highly filled with sulphur.

By way of preference, the composition contains more than 20 parts per hundred rubber of sulphur.

A covering layer with such an elastomeric material may advantageously comprise a two-dimensional fibre assembly such as a woven or a nonwoven with a very low apparent density prior to impregnation.

Such a covering layer has the advantage, once the green tyre has been vulcanized, of having a very high rigidity very beneficial to the behaviour of the tyres on snowy ground when the orientation of the cut which comprises the covering layer has an orientation with a component normal to the circumferential direction of the pneumatic tyre.

(4) Preparation

The elastomeric material composition based on diene rubber is manufactured in suitable mills, using two successive preparation phases according to a general procedure well known to those skilled in the art: a first phase of thermomechanical kneading or work (sometimes qualified as the "non-productive" phase) at high temperature, up to a maximum temperature comprised between 130° C. and 200° C., preferably between 145° C. and 185° C., followed by a second phase of mechanical work (sometimes qualified as the "productive" phase) at a lower temperature, typically below 120° C., for example between 60° C. and 100° C., during which finishing phase the crosslinking or vulcanizing system is incorporated.

The fibre assembly is then impregnated with this composition as indicated previously, by hot calendering, moulding in a press or injection under pressure.

2. Thermoplastic Elastomer

According to a second embodiment of the elastomeric material of the covering layer, the composition of this elastomeric material is based on at least one thermoplastic elastomer, the thermoplastic elastomer being a block copolymer comprising at least one elastomer block and at least one thermoplastic block.

a) Thermoplastic Elastomer (TPE)

Thermoplastic elastomers (TPEs for short) have a structure that is somewhere between a thermoplastic polymer and an elastomer. These are block copolymers consisting of rigid, thermoplastic, blocks, connected by flexible, elastomer, blocks.

The thermoplastic elastomer used for carrying out one aspect of the invention is a block copolymer the chemical nature of the thermoplastic blocks and the elastomer blocks of which can vary.

(1) Structure of the TPE

The number average molecular weight (Mn) of the TPE is preferably comprised between 30 000 and 500 000 g/mol, more preferably comprised between 40 000 and 400 000 g/mol. Below the indicated minima there is a risk of the cohesion between the elastomer sequences of the TPE being adversely affected, notably as a result of its potentially being diluted (in the presence of an extension oil); furthermore, increasing the service temperature carries the risk of adversely affecting the mechanical properties, notably the rupture properties, resulting in reduced "hot" performance. Furthermore, too high an Mn may be penalizing in terms of workability. Thus, it has been found that a value comprised in the range from 50 000 to 300 000 g/mol was particularly well suited, notably to use of the TPE in a composition for a covering layer.

The number average molecular weight (Mn) of the TPE is determined in the known way, by steric size exclusion chromatography (SEC). For example, in the case of thermoplastic styrene elastomers, the test specimen is dissolved beforehand in tetrahydrofuran at a concentration of around 1 g/l; then the solution is filtered on a filter of porosity 0.45 µm prior to injection. The apparatus used is a WATERS alliance chromatograph. The elution solvent is tetrahydrofuran, the flow rate is 0.7 ml/min, the temperature of the system is 35° C. and the analytical time is 90 min. A set of four WATERS columns in series, with the "STYRAGEL" trade names ("HMW7", "HMW6E" and two "HT6E") is used. The injected volume of the solution of the polymer sample is 100 µl. The detector is a "WATERS 2410" differential refractometer and its associated software for handling the chromatograph data is the "WATERS MILLENIUM" system. The calculated average molar masses are relative to a calibration curve produced with polystyrene standards. The conditions can be adapted by a person skilled in the art.

The value of the polydispersity index Ip (remember: Ip=Mw/Mn where Mw is the mean molecular weight and Mn is the number average molecular weight) of the TPE is preferably lower than 3; more preferably lower than 2 and more preferably still, lower than 1.5.

In the present application, although reference is made to the glass transition temperature of the TPE, this is the Tg relative to the elastomer block. The TPE preferably has a glass transition temperature ("Tg") which is preferably lower than or equal to 25° C., more preferably lower than or equal to 10° C. A Tg value higher than these minima may reduce the performance of the covering layer when used at very low temperatures; for such use, the Tg of the TPE is more preferably still, lower than or equal to −10° C. As a preference also, the Tg of the TPE is higher than −100° C.

In the known way, TPEs have two glass transition temperature spikes (Tg measured in accordance with ASTM D3418), the lower temperature relating to the elastomer part of the TPE, and the higher temperature relating to the thermoplastic part of the TPE. Thus, the flexible blocks of the TPEs are defined by a Tg lower than ambient temperature (25° C.), whereas the rigid blocks have a Tg that is higher.

In order to be both elastomeric and thermoplastic in nature, the TPE needs to be provided with blocks that are sufficiently incompatible (i.e. different on account of their respective weight, their respective polarity or their respective Tg) that they maintain their inherent elastomer block or thermoplastic block properties.

The TPEs may be copolymers with a small number of blocks (fewer than 5, typically 2 or 3), in which case these blocks preferably have high weights, in excess of 15 000 g/mol. These TPEs may for example be di-block copolymers, comprising one thermoplastic block and one elastomer block. They are also often tri-block elastomers with two rigid segments connected by a flexible segment. The rigid and flexible segments may be arranged in a line, in a star or in a branched configuration. Typically each one of these segments or blocks often contains at least more than 5, generally more than 10 base units (for example styrene units and butadiene units in the case of a styrene/butadiene/styrene block copolymer).

The TPEs may also comprise a great many blocks (more than 30, typically from 50 to 500) which are smaller, in which case these blocks preferably have fairly low weights, for example from 500 to 5000 g/mol, these TPEs will be referred to hereinafter as multi-block TPEs, and are a sequence of elastomer blocks and thermoplastic blocks.

According to a first alternative form, the TPE takes a linear form. For example, the TPE is a diblock copolymer: thermoplastic block/elastomer block. The TPE may also be a tri-block copolymer: thermoplastic block/elastomer block/thermoplastic block, namely a central elastomer block and two terminal thermoplastic blocks, one at each of the two ends of the elastomer block. Also, the multi-block TPE may be a linear sequence of elastomer blocks and thermoplastic blocks.

According to another alternative form of the invention, the TPE that is of use for the purposes of the invention takes a star shape with at least three branches. For example, the TPE may then be made up of a star-shaped elastomer block having at least three branches and of a thermoplastic block situated at the end of each of the branches of the elastomer block. The number of branches of the central elastomer may vary, for example from 3 to 12, and preferably from 3 to 6.

According to another alternative form of the invention, the TPE takes a branched or dendrimer form. The TPE may then be made up of a branched or dendrimer elastomer block and of a thermoplastic block situated at the end of the branches of the dendrimer elastomer block.

(2) Nature of the Elastomer Blocks

The elastomer blocks of the TPE for the purposes of the invention may be any elastomer known to those skilled in the art. They preferably have a Tg lower than 25° C., preferably lower than 10° C., more preferably lower than 0° C. and highly preferably lower than −10° C. Also for preference, the Tg of the elastomer block of the TPE is above −100° C.

In the case of carbon chain elastomer blocks, if the elastomer part of the TPE has no ethylene unsaturation, it will be said to be a saturated elastomer block. If the elastomer block of the TPE has ethylene unsaturations (i.e. carbon—carbon double bonds), it will then be referred to as an unsaturated or diene elastomer block.

A saturated elastomer block is made up of a polymer sequence obtained by polymerizing at least one (i.e. one or more) ethylene monomers, i.e. ones containing a carbon—carbon double bond. Included among the blocks derived from these ethylene monomers, mention may be made of polyalkylene blocks such as ethylene—propylene or ethylene—butylene statistical copolymers. These saturated elastomer blocks may also be obtained by hydrogenating unsaturated elastomer blocks. They may also be aliphatic blocks derived from the family of polyethers, polyesters or polycarbonates.

In the case of saturated elastomer blocks, this elastomer block of the TPE is preferably made up predominantly of ethylene units. What is meant by predominantly is a content by weight of ethylene monomer which is as high as possible relative to the total weight of the elastomer block, and preferably a weight content of more than 50 wt %, more preferably of more than 75 wt % and more preferably still, of more than 85 wt %.

$C_4$-$C_{14}$ conjugated dienes can be copolymerized with ethylene monomers. These then are statistical copolymers. For preference, these conjugated dienes are selected from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene or blends thereof. More preferably, the conjugated diene is isoprene or a blend containing isoprene.

In the case of unsaturated elastomer blocks, this elastomer block of the TPE is preferably made up predominantly of a diene elastomer part. What is meant by predominantly is a content by weight of diene monomer that is as high as possible relative to the total weight of the elastomer block, and preferably a content by weight of more than 50 wt %, more preferably more than 75 wt % and more preferably still, of more than 85 wt %. Alternatively, the unsaturation of the unsaturated elastomer block may derive from a monomer comprising a double bond and an unsaturation of cyclic type, which is the case with polynorbornene for example.

For preference, $C_4$-$C_{14}$ conjugated dienes may be polymerized or copolymerized to form a diene elastomer block. For preference, these conjugated dienes are selected from isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene or blends thereof. More preferably, the conjugated diene is isoprene or butadiene or a blend containing isoprene and/or butadiene.

According to an alternative form, the monomers polymerized to form the elastomer part of the TPE may be copolymerized, statistically, with at least one other monomer so as to form an elastomer block. In this alternative form, the molar fraction of polymerized monomer other than ethylene monomer, relative to the total number of units of the elastomer block, needs to be such that this block maintains its elastomer properties. Advantageously the molar fraction of this other comonomer may range from 0 to 50%, more preferably from 0 to 45%, and more preferably still, from 0 to 40%.

By way of illustration, this other monomer capable of copolymerizing with the first monomer may be selected from ethylene monomers as defined hereinabove (for example ethylene), diene monomers, more particularly conjugated diene monomers having from 4 to 14 carbon atoms as defined hereinabove (for example butadiene), monomers of vinylaromatic type having from 8 to 20 carbon atoms as defined hereinabove or, alternatively, it may be a monomer such as vinyl acetate.

When the comonomer is of vinylaromatic type, it advantageously represents a fraction of units with respect to the total number of units of the thermoplastic block of 0 to 50%, preferably ranging from 0 to 45%, and more preferably still ranging from 0 to 40%. By way of vinylaromatic compounds notably the styrene monomers mentioned hereinabove, namely methylstyrenes, para-tert-butylstyrene, chlorostyrenes, bromostyrenes, fluorostyrenes or even para-hydroxystyrenes, are suitable. For preference, the comonomer of vinylaromatic type is styrene.

According to a preferred embodiment of the invention the elastomer blocks of the TPE have, in total, a number average molecular weight (Mn) ranging from 25 000 g/mol to 350

000 g/mol, preferably from 35 000 g/mol to 250 000 g/mol, so as to give the TPE good elastomeric properties and sufficient mechanical integrity compatible with use in a covering layer covering a lateral face of a tyre tread pattern element.

The elastomer block may also be a block containing several types of ethylene, diene or styrene monomers as defined hereinabove.

The elastomer block may also be made up of several elastomer blocks as defined hereinabove.

(3) Nature of the Thermoplastic Blocks

The glass transition temperature (Tg) of the rigid thermoplastic block will be used to define the thermoplastic blocks. This characteristic is well known to those skilled in the art. It notably allows the industrial workability (conversion) temperature to be selected. In the case of an amorphous polymer (or polymer block), the workability temperature is chosen to be significantly higher than the Tg. In the specific case of a semicrystalline polymer (or polymer block), a melting point that is then higher than the glass transition temperature may be observed. In such cases it is rather the melting point (Tf) that is used for selecting the workability temperature of the polymer (or polymer block) under consideration. Thus, hereinafter, where mention is made of "Tg (or Tf where appropriate)", this is to be considered to refer to the temperature used for selecting the workability temperature.

For the purposes of the invention, TPEs comprise one or more thermoplastic block(s) preferably having a Tg (or Tf where appropriate) higher than or equal to 80° C. and consisting of polymerized monomers. For preference, this thermoplastic block has a Tg (or Tf where appropriate) comprised in a range varying from 80° C. to 250° C. For preference, the Tg (or Tf where appropriate) of this thermoplastic block is preferably from 80° C. to 200° C., more preferably from 80° C. to 180° C.

The proportion of thermoplastic blocks in relation to the TPE, as defined for the implementation of the invention, is determined first by the thermoplasticity properties that the said copolymer is to exhibit. Thermoplastic blocks having a Tg (or Tf where appropriate) higher than or equal to 80° C. are preferably present in sufficient proportions to maintain the thermoplastic nature of the elastomer according to the invention. The minimum content of thermoplastic blocks having a Tg (or Tf where appropriate) higher than or equal to 80° C. in the TPE may vary according to the conditions in which the copolymer is to be used. Further, the ability of the TPE to deform during preparation of the tyre may also contribute toward determining the proportion of thermoplastic blocks having a Tg (or Tf where appropriate) higher than or equal to 80° C.

The thermoplastic blocks having a Tg (or Tf where appropriate) higher than or equal to 80° C. may be made up of polymerized monomers of various kinds, notably they may constitute the following blocks or blends thereof:

polyolefins (polyethylene, polypropylene)
polyurethanes;
polyamides;
polyesters;
polyacetals;
polyethers (polyethylene oxide, polyphenylene ether);
polyphenylene sulphides;
polyfluorides (FEP, PFA, ETFE);
polystyrenes (detailed hereinbelow);
polycarbonates;
polysulfones;
polymethylmethacrylate;
polyetherimide;
thermoplastic copolymers such as acrylonitrile-butadiene-styrene (ABS) copolymer.

The thermoplastic blocks having a Tg (or Tf where appropriate) higher than or equal to 80° C. may also be obtained from monomers selected from the following compounds and blends thereof:

acenaphthylene: a person skilled in the art will for example be able to refer to the article by Z. Fodor and J. P. Kennedy, Polymer Bulletin 1992 29(6) 697-705;

indene and its derivatives, for example 2-methylindene, 3-methylindene, 4-methylindene, dimethyl-indene, 2-phenylindene, 3-phenylindene and 4-phenylindene; a person skilled in the art will be able for example to refer to patent document US4946899 by the inventors Kennedy, Puskas, Kaszas and Hager and to the documents by J. E. Puskas, G. Kaszas, J. P. Kennedy, W. G. Hager Journal of Polymer Science Part A: Polymer Chemistry (1992) 30, 41 and by J. P. Kennedy, N. Meguriya, B. Keszler, Macromolecules (1991) 24(25), 6572-6577;

isoprene, which then leads to the formation of a certain number of 1,4-trans polyisoprene units and of cyclized units according to an intramolecular process; a person skilled in the art will be able for example to refer to the documents by G. Kaszas, J. E. Puskas, J. P. Kennedy Applied Polymer Science (1990) 39(1) 119-144 and by J. E. Puskas, G. Kaszas, J. P. Kennedy, Macromolecular Science, Chemistry A28 (1991) 65-80.

The polystyrenes are obtained from styrene monomers. A styrene monomer is to be understood in the present description to mean any monomer comprising styrene, unsubstituted or substituted; substituted styrenes that can be mentioned include for example methylstyrenes (for example o-methylstyrene, m-methylstyrene or p-methylstyrene, alpha-methylstyrene, alpha-2-dimethylstyrene, alpha-4-dimethylstyrene or diphenylethylene), para-tert-butylstyrene, chlorostyrenes (for example o-chlorostyrene, m-chlorostyrene, p-chlorostyrene, 2,4-dichlorostyrene, 2,6-dichlorostyrene or 2,4,6-trichlorostyrene), bromostyrenes (for example o-bromostyrene, m-bromostyrene, p-bromostyrene, 2,4-dibromostyrene, 2,6-dibromostyrene or 2,4,6-tribromostyrene), fluorostyrenes (for example o-fluorostyrene, m-fluorostyrene, p-fluorostyrene, 2,4-difluorostyrene, 2,6-difluorostyrene or 2,4,6-trifluorostyrene) or even para-hydroxy-styrene.

According to a preferred embodiment of the invention, the weight content of styrene, in the TPE, is comprised between 5% and 50%. Below the indicated minimum there is a risk that the thermoplastic nature of the elastomer will diminish appreciably whereas above the recommended maximum, the elasticity of the covering layer may be adversely affected. For these reasons, the styrene content is more preferably comprised between 10% and 40%.

According to an alternative form of the invention, the polymerized monomer as defined hereinabove may be copolymerized with at least one other monomer to form a thermoplastic block having a Tg (or Tf where appropriate) as defined hereinabove.

By way of illustration, this other monomer that can be copolymerized with the polymerized monomer may be selected from diene monomers, more particularly conjugated diene monomers having 4 to 14 carbon atoms, and monomers of the vinylaromatic type having from 8 to 20 carbon atoms, as defined in the section relating to the elastomer block.

According to the invention, the thermoplastic blocks of the TPE have, in total, a number average molecular weight (Mn) ranging from 5 000 g/mol to 150 000 g/mol, so as to give the TPE good elastomeric properties and sufficient mechanical strength compatible with its use as a covering layer.

The thermoplastic block may also be made up of several thermoplastic blocks as defined hereinabove.

(4) Examples of TPE

For example, the TPE is a copolymer the elastomer part of which is saturated, and which comprises styrene blocks and alkylene blocks. The alkylene blocks are preferably ethylene, propylene or butylene. More preferably, this TPE is selected from the following group, consisting of linear or branched star-shaped triblock or diblock copolymers: styrene/ethylene/butylene (SEB), styrene/ethylene/propylene (SEP), styrene/ethylene/ethylene/propylene (SEEP), styrene/ethylene/butylene/styrene (SEBS), to styrene/ethylene/propylene/styrene (SEPS), styrene/ethylene/ethylene/propylene/styrene (SEEPS), styrene/isobutylene (SIB), styrene/isobutylene/styrene (SIBS) and blends of these copolymers.

According to another example, the TPE is a copolymer the elastomer part of which is unsaturated and which comprises styrene blocks and diene blocks, these diene blocks being in particular isoprene or butadiene blocks. More preferably, this TPE is selected from the following group consisting of linear or branched star-shaped diblock or triblock copolymers: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS) and blends of such copolymers.

For example also, the TPE is a linear or branched star-shaped copolymer the elastomer part of which comprises a saturated part and an unsaturated part such as styrene/butadiene/butylene (SBB), styrene/butadiene/butylene/styrene (SBBS) or a blend of these copolymers for example.

Of the multiblock TPEs, mention may be made of the copolymers comprising statistical copolymer blocks of ethylene and of propylene/polypropylene, polybutadiene/polyurethane (TPU), polyether/polyester (COPE), polyether/polyamide (PEBA).

It is also possible for the TPEs quoted as examples hereinabove to be blended with one another within the composition of the elastomeric material of the covering layer, according to one aspect of the invention.

By way of examples of commercially available TPEs, mention may be made of the elastomers of SEPS, SEEPS or SEBS type marketed by the Kraton company under the trade name "Kraton G" (e.g. products G1650, G1651, G1654, G1730) or by the Kuraray company under the trade name "Septon" (e.g. "Septon 2007", "Septon 4033", "Septon 8004"); or elastomers of SIS type marketed by Kuraray under the name "Hybrar 5125" or marketed by Kraton under the name of "D1161" or even the elastomers of linear SBS type marketed by Polimeri Europa under the trade name "Europrene SOL T 166" or star-shaped branched SBS elastomers marketed by Kraton under the trade name "D1184". Mention may also be made of the elastomers marketed by the company Dexco Polymers under the trade name of "Vector" (e.g. "Vector 4114", "Vector 8508"). Of these multiblock TPEs, mention may be made of the TPE "Vistamaxx" marketed by the Exxon company; the COPE TPE marketed by the DSM company under the trade name "Arnitel" or by the Dupont company under the trade name "Hytrel" or by the Ticona company under the trade name "Riteflex"; the PEBA TPE marketed by the Arkema company under the trade name "PEBAX"; the TPU TPE marketed by the Sartomer company under the trade name "TPU 7840" or by the BASF company under the trade name "Elastogran".

(5) Quantity of TPE

While other (nonthermoplastic) elastomers might be used in the thermoplastic elastomer composition, the TPE or TPEs constitute the predominant fraction by weight. Thus, the quantity of TPE is comprised in a range varying from 65 to 100 phr, preferably from 70 to 100 phr. Of course the sum of the quantities of TPE and diene elastomers is always 100 phr.

The TPE or TPEs are preferably the only elastomers in the covering layer.

(6) Other Elements in the Composition

The composition of the elastomeric material may also contain fillers or various additives as already described.

(7) Preparation

The TPEs can be worked in a way that is conventional for TPEs, by extrusion or moulding, for example from a raw material available in the form of beads or granules.

The elastomeric material based on a thermoplastic elastomer according to the invention is prepared in a conventional way, for example by incorporating the various components in a twin-screw extruder so as to melt the matrix and incorporate all the ingredients, then by using a die to create the profiled element. The fibre assembly is then impregnated with the elastomeric material as previously indicated by hot calendering or injection under pressure.

If the elastomer block of the TPE is a saturated elastomer block, it may be necessary to include between the covering layer and the adjacent wall of the tread pattern element of the tread a tack film or layer or coat which will contain a TPE with an unsaturated elastomer block to promote adhesion between the said covering layer and the adjacent layer of the tread within the finished tyre.

III. Tread with Covering Layer

Figure 1:
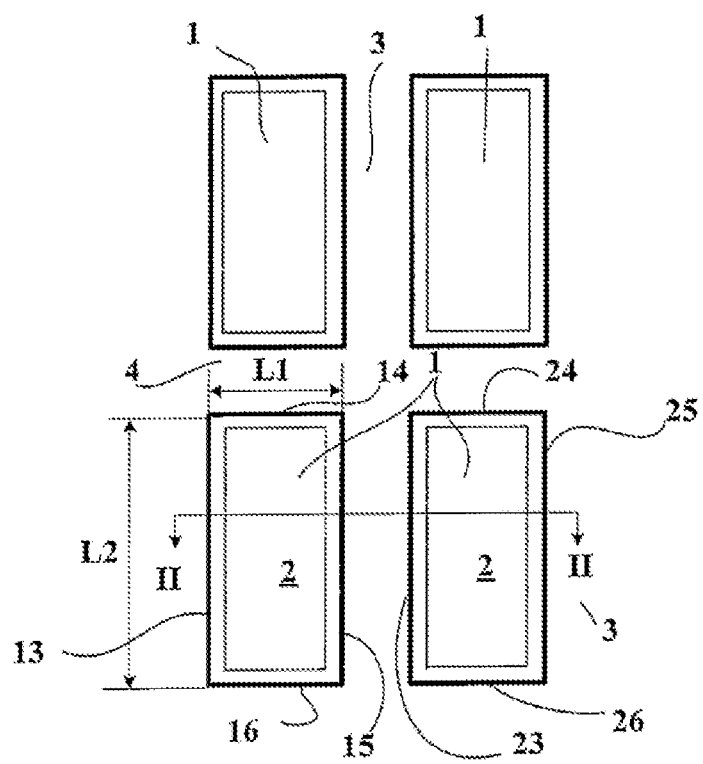
FIG. 1 depicts a partial plan view of a block pattern of a tread.

FIG. 1 shows contact faces 2 of blocks 1 of rectangular shape of a tread pattern according to the invention, the said blocks 1 being delimited by grooves of longitudinal orientation 4 and of transversal or axial orientation 3. Each of these blocks 1 comprises four lateral faces 13, 14, 15, 16 of which the intersections with the contact face 2 respectively form edge corners 23, 24, 25, 26 which play an important part in driving particularly on a road surface that has become slippery (notably through the presence of water or snow). Each block 1 is of rectangular shape of width L1 and of length L2 (the direction of the width L1 of the blocks being, in the situation described, coincident with the longitudinal direction of the tread or even the circumferential direction on the tyre provided with the tread).

The four lateral faces 13, 14, 15, 16 are covered completely with a thickness E1 (visible in FIG. 2) that is substantially constant (over the entire height Hr of covering, in this instance equal to the depth H of the grooves) of a covering layer MR different from a rubber composition MB (referred to in what follows as the base composition).

Figure 2:
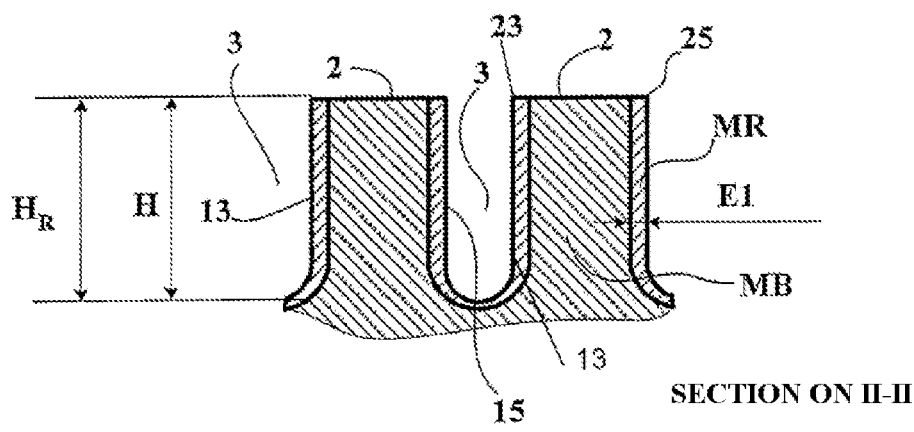
FIG. 2 shows the blocks of FIG. 1 in cross section on the line of section II-II.

In the cross section depicted in FIG. 2 and taken along the line II-II of FIG. 1 and perpendicular to the contact faces 2 of two blocks 1, it is possible to see the presence at the surface of the layer of covering material MR on the lateral faces 13 and 15 bounding the transversally oriented grooves 3.

The tread pattern elements depicted comprise a layer of covering material on all their lateral faces, but in order to obtain an improvement in grip on snowy ground, it is the lateral faces the orientation of which is normal to the circumferential direction of the tyre or the orientation of which has a component normal to the circumferential direction that need preferably to be covered with such a layer of covering material.

According to this embodiment of the invention, the covering material extends, in the new condition, as far as the edge corner formed by the boundary between the contact face and the lateral face of the tread pattern element.

The thickness E1 of the layer of covering material MR is preferably greater than 0.1 mm, more preferably comprised between 0.25 and 3.5 mm depending on the application.

According to another embodiment (not depicted) of the invention, the covering material extends radially, in the new condition, from the bottom of the cut up to a distance Hr of 4 mm. This embodiment is of use in restoring to a snow tyre additional grip on snowy ground when the rest of the tread has been worn down. This additional grip is particularly sharp when the covering materials are arranged on lateral faces normal to the circumferential direction of the tyre or the orientation of which has a component normal to the circumferential direction of the tyre.

IV. Manufacture of a Tread with Covering Layer

A. Manufacture of a covering layer

The first step in manufacturing a tread with a covering layer is to prepare the covering layer.

Having chosen a woven or nonwoven fibre assembly and cut it to the suitable dimensions, this fibre assembly is impregnated with one or two layers of elastomer material depending on the thickness of the covering layer to be prepared and depending on the nature of the fibre assembly and of the elastomer material.

This impregnation may be performed in the hot state under pressure in a mould for example.

B. Moulding a Tread with Covering Layer

In the description which follows, elements which are substantially identical or similar will be denoted by identical references. One way of obtaining such a tread pattern is for example to cover the entirety of a green form of a tread produced from a base compound with a layer of covering material of suitable thickness before moulding the tread and the grooves and the sipes. After moulding, the covering material on the contact face of the rib can be left in place or alternatively eliminated by a mechanical means (notably by grinding).

Another way of industrially producing a tread according to the invention may consist in applying, to the unvulcanized green form of the tyre provided with a tread made of an unvulcanized base compound, thin strips of a covering material different from the base compound, as described in document EP 0510550 (it being possible for the thin strips to be applied to the tread in the circumferential and/or transverse direction). Another way may consist in producing the tread by coextruding two (or more) compounds when the tread is being extruded.

One preferred embodiment is now described. In the description which follows, elements which are substantially identical or similar will be denoted by identical references.

Figure 5:
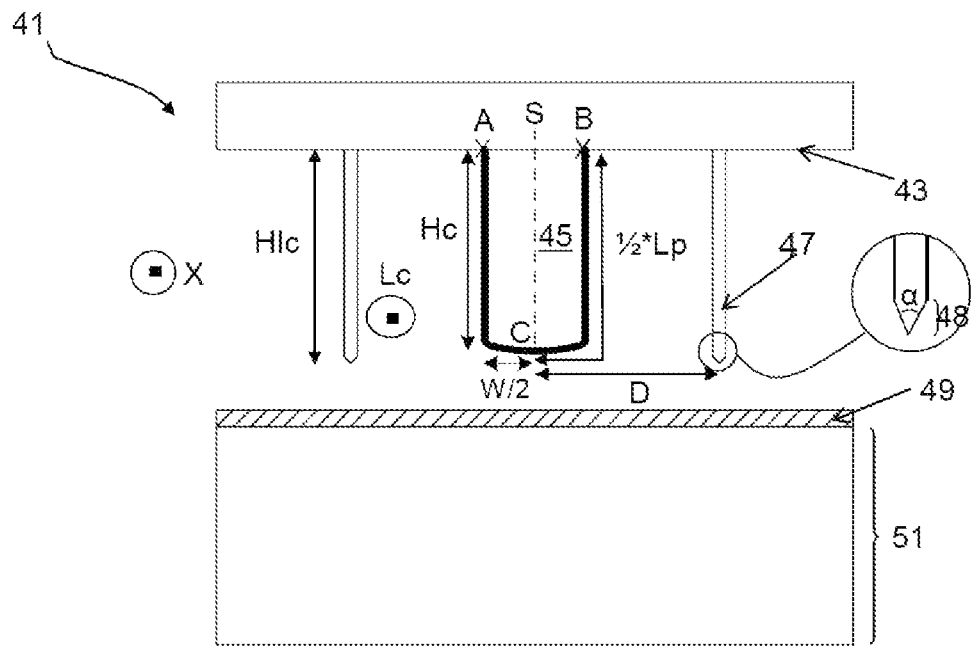
FIG. 5 schematically depicts a moulding element according to a method for moulding a tread of the invention.

FIG. 5 depicts a moulding element 41 according to one aspect of the invention.

More particularly, the moulding element 41 comprises a moulding surface 43 intended to mould part of the tread surface of a tyre. The moulding element 41 also comprises blades 45 just one of which has been depicted here to make the invention easier to understand. The blade in this instance is a bar 45 intended to mould a groove in the tread of the tyre. What is meant by a "groove" in a tread is a cut into this tread of which the width, i.e. the distance separating two lateral walls of this groove, is greater than 2 mm. The bar 45 also extends heightwise from this moulding surface 43. The bar 45 also extends lengthwise in a direction of longitudinal extension X while projecting from the moulding surface 43. In the mould, this direction may be a circumferential direction which follows the circumference of the mould. As an alternative, the direction of longitudinal extension is a transverse direction perpendicular to the circumferential direction of the mould. In another alternative form, this direction of longitudinal extension is an oblique direction making a non-zero angle with the circumferential direction and the transverse direction of the mould.

FIG. 5 depicts the moulding element 41 viewed in a plane of section perpendicular to the direction of extension X. In this plane of section, the bar 45 has a cross section exhibiting symmetry about an axis of symmetry S. The axis of symmetry S here extends in the height Hc of the bar 45 and divides this bar 45 into two half-bars of width W/2.

The cross section of the bar in this instance is of rectangular shape. "Rectangular shape" means that the upper face of the bar is perpendicular to the lateral faces of this bar, i.e. that the lateral faces of the bar make with the upper face of this bar an angle comprised between 85° and 95°.

The invention also encompasses instances in which the regions of connection between the lateral faces of the bar and the upper face of this bar are rounded and instances in which the regions of connection between the lateral faces of the bar and the base are likewise rounded.

In additional alternative forms of the embodiment, the cross section of the bar may adopt a shape other than a rectangular shape, such as a square shape, a triangular shape, etc.

It will also be noted that the cross section of the bar 45 has, between two points of intersection A and B of the bar 45 with the moulding surface 43, a profile that has been indicated in bold lines in FIG. 5. This profile has a profile length Lp such that Lp=2*(Hc+W/2), i.e. the profile length Lp corresponds to twice the height Hc of the bar 5 plus the width W of this bar.

In the example of FIG. 5, the points of intersection A and B are easy to determine, the lateral walls of the bar 45 being perpendicular to the moulding surface 43. As an alternative, in instances in which the lateral walls of the bar are connected to the moulding surface 43 by two rounded regions of connection forming two arcs of a circle, the points of intersection A and B correspond respectively to the intersection of the arcs of a circle with straight lines passing through the centres of the arcs of a circle and dividing these arcs into two identical half arcs.

The moulding element 41 of FIG. 5 also has two cutting means 47 arranged one on each side of the bar 45. These cutting means extend along their length in a direction parallel to the longitudinal direction X of the bar 45. A "direction parallel" means that the direction in which the cutting means extend makes an angle comprised between −5° and +5° with the direction of longitudinal extension X of the bar. The height Hlc of the cutting means is at least equal to the height Hc of the bar.

Each cutting means has an end 48 able to cut a layer 49 of a covering material, this covering material covering a green form 51 of a tyre tread. More particularly, each cutting means comprises at its end a cutting edge (depicted as a point in FIG. 5). This cutting edge has, in the plane of FIG. 5, an angle α smaller than or equal to 60° (refer to the inset detail associated with FIG. 5 and which is an enlargement of the end of one of the two cutting means 47). In a preferred embodiment, the angle α is smaller than or equal to 35°.

It will be noted that this cutting edge may have been hardened beforehand in order to improve its mechanical integrity over time. For example, the cutting edge may have been hardened during a special heat treatment. As an alternative, it is possible to plan for the material of which the cutting edge is made to be stronger than the rest of the moulding element.

It will also be noted that the cutting means 47 are arranged in the moulding element 41 in such a way that the distance D between each end of the cutting means and the axis of symmetry S of the cross section of the bar 45 is less than or equal to half the length Lp of the profile of the section, such that D=Hc+W/2. Stated differently, the axis of symmetry S intersects the profile of the bar 45 at a point C to define two sub-profiles. A first sub-profile corresponds to segment A-C and a second sub-profile corresponds to the segment B-C. For each cutting means, the distance between the cutting edge of this cutting means and the axis of symmetry S is less than or equal to the length of the sub-profile adjacent to this cutting means, i.e. the sub-profile belonging to the nearest half-bar of the cutting means. In the example of FIG. 5, the closest sub-profile to the cutting means 47 is the sub-profile corresponding to the segment B-C.

FIGS. 6a to 6d illustrate in greater detail the various steps for placing the covering material in a groove of the tread.

Figure 6A:
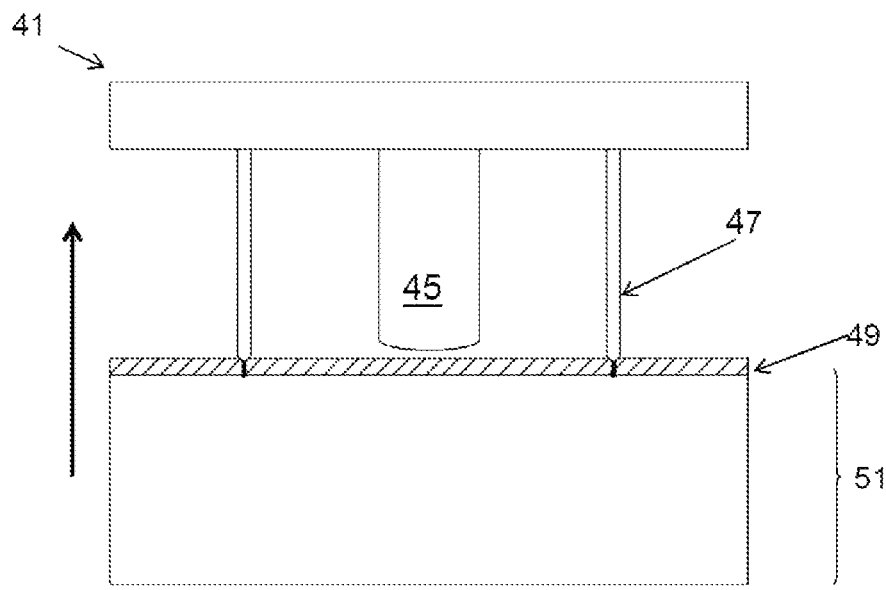
FIG. 6a illustrates a first moulding step performed by the moulding element of FIG. 5, in which step cutting means are in contact at their end with the covering layer that covers the green form of the tread.

FIG. 6a notably discloses a first step in which the moulding element 41 and the green tyre 51 are brought closer together. This bringing-together movement is initiated, for example, by a membrane (not depicted) in the mould. Under the action of a quantity of pressurized steam, this membrane inflates and pushes the green tyre towards the moulding element 41. More particularly, FIG. 6a shows the moment at which the cutting means 47 cut into the covering material 49. This cutting step is made easier by the action of the cutting edges of the cutting means.

Figure 6B:
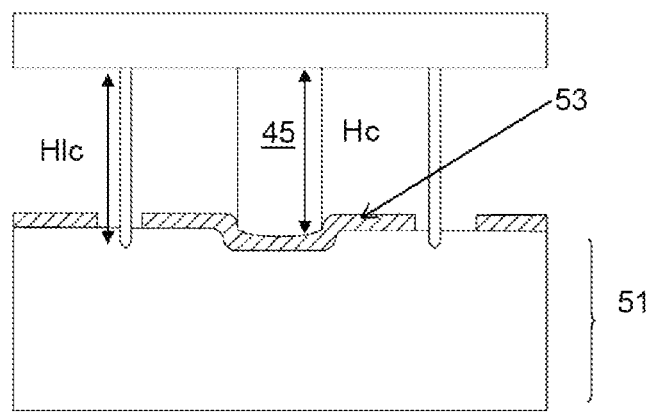
FIG. 6b illustrates a second moulding step in which the blade is in contact with the covering layer that covers the green tyre.

FIG. 6b illustrates a second step in which the bar 45 is pushed into the green tyre 51. More particularly, in this step, the bar 45 comes into contact with a bit 53 of material that has been cut in the layer of covering material. The bar 45 thus drives this bit 53 into the depth of the green tyre 51.

It will be noted here that the height Hlc of the cutting means 47 is greater than the height Hc of the bar 45. Thus, the cutting step of FIG. 6a comes before the step in which the bar 45 pushes into the green tyre 51. As an alternative, it is possible to plan for the height Hlc of the cutting means 47 to be identical to the height Hc of the bar 45. In that case, the step of FIG. 6a and the step of FIG. 6b occur simultaneously.

Figure 6C:
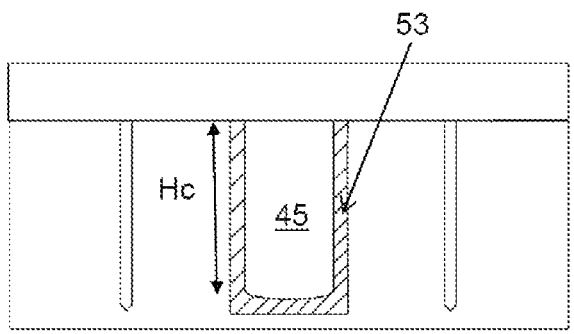
FIG. 6c illustrates a third moulding step in which the cutting means and the blade are completely positioned in the green tyre.

FIG. 6c illustrates a third step in which the bar 45 is pushed into the green tyre over its entire height Hc. All of the bit 53 of covering material therefore finds itself within the green tyre. Once this step has been performed, it is then possible to vulcanize the green tyre, i.e. to convert the rubber material of which the green tyre is made from the plastic to the elastic state.

Figure 6D:
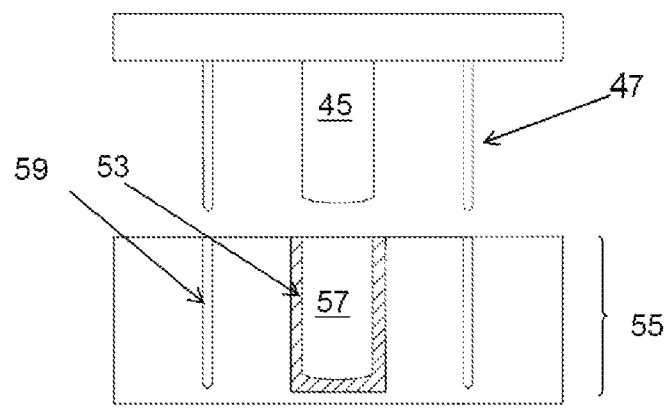
FIG. 6d schematically depicts part of the tread according to the invention at the end of the moulding steps of FIGS. 6a-6c.

FIG. 6d depicts the result of the various steps of moulding and vulcanizing the green tyre illustrated in FIGS. 6a to 6c. The bit of tread 55 thus obtained comprises a groove 57 obtained by moulding rubber around the bar 45 and two sipes 59 obtained by moulding rubber around the two cutting means 47. It will be noted here that all of the walls of the groove, i.e. the lateral walls and the bottom wall flanked by the lateral walls, are covered by the cut bit 53 of covering material.

V. Tests

Various tests for creating tyres with treads comprising covering layers in the cuts were carried out.

Table 1 describes the various tests carried out.

Table 2 gives the formulations of the elastomeric materials used, and table 3 presents the results of the friction tests carried out.

TABLE 1

|  | A1 | A2 | A3 | A4 | A5 |
|---|---|---|---|---|---|
| Fibre assembly | Cotton fabric (1) | Cotton fabric (1) | Viscose felt (2) | Viscose felt (2) | Viscose felt (2) |
| Elastomeric material | ME1 | ME2 | ME2 | ME2 | ME2 |
| Layering | strip of cotton 1 layer of elastomeric material | strip of cotton 1 layer of elastomeric material | 1 mm of baize 2 layers of elastomeric material | 1 mm of baize 2 layers of elastomeric material | 1 mm of baize 1 layer of elastomeric material |
| Impregnation conditions | T = 160° C. P = 16 bar T = 9 minutes | T = 160° C. P = 16 bar T = 9 minutes | T = 160° C. P = 16 bar T = 11 minutes | T = 160° C. P = 16 bar T = 20 minutes | T = 160° C. P = 16 bar T = 9 minutes |

(1) Cotton fabric (Coco swatch, Cournon-d'Auvergne)
(2) Viscose felt, 100% viscose, 275 g/m², thickness: 1 mm (www.feutrine-express.fr).

TABLE 2

|  | ME1 (phr) | ME2 (phr) |
|---|---|---|
| NR (1) | 40.0 |  |
| SBR (2) | 60.0 |  |
| SBR (3) |  | 100.0 |
| Carbon black (4) | 37.5 | 10.0 |
| Liquid plasticizer (5) | 2.0 |  |
| Liquid plasticizer (6) |  | 10.0 |
| Plasticizing resin (7) |  | 17.1 |
| ZnO (8) | 10 | 1.5 |
| Stearic acid (9) | 1.0 | 3.0 |
| 6PPD (10) | 2.0 | 2.2 |
| Sulphur | 27.0 | 1.4 |
| CBS (11) | 13.5 | 1.6 |

(1) Natural rubber (RSS#3);
(2) Solution SBR (contents expressed in dry SBR: 23% styrene, 15% 1-2 polybutadiene units and 70% 1-4 trans polybutadiene units (Tg = −52° C.);
(3) Solution SBR (contents expressed in dry SBR: 44% styrene, 41% 1-2 polybutadiene units (Tg = −12° C.);
(4) Carbon black N234;
(5) MES oil ("Catenex SNR" by Shell)
(6) TDAE oil "Vivatec 500" by the Hansen & Rosenthal company
(7) Type C5 hydrocarbon resin ("Wingtack 86" by the Crayvalley company);
(8) Zinc oxide (industrial grade-Umicore company);
(9) Stearine ("Pristerene" by the Uniquema company);
(10) N-1,3-dimethylbutyl-N-phenylparaphenylenediamine ("Santoflex 6-PPD" by the Flexsys company); DPG = Diphenylguanidine ("Perkacit DPG" by the Flexsys company);
(11) N-cyclohexyl-2-benzothiazyl-sulfenamide ("Santocure CBS" by the Flexsys company).

The first test A1 was carried out with a covering layer consisting of a woven cotton fibre fabric by way of fibre assembly and with a layer of a diene compound ME1 heavily filled with sulphur by way of impregnation elastomeric material.

The assembly was placed in a platen press under a pressure of 16 bar at a temperature of 160° C. for a duration of 9 minutes in order to impregnate the fabric with the compound. The final thickness of the covering layer was of the order of 0.6 mm.

After impregnation, strips of covering layer were placed on the surface of a green form of pneumatic tyre tread. It should be noted that some of the cotton threads (the warp or weft threads) were orientated perpendicular to the direction of travel intended during moulding so that they would oppose any stretching of the covering layer during moulding.

It is preferable to position the cotton fabric on the mould side rather than on the green tyre tread side as this makes the cutting of the fabric and the sliding of the covering layer into position in the cut easier.

The assembly was then placed in a mould, and the moulding operations as described in FIGS. 6a to 6d were then carried out without difficulty, the cotton fabric allowed precise placement of the covering layer in the cuts in the tread. In particular, the very fine cotton fabric could be cut without difficulty by the blades 47 and the bar 45 drove the covering layer into the cuts 3, 4, 57 in the tread as planned.

The elastomeric material ME1, highly filled with sulphur, has a behaviour in the to raw state or with limited prevulcanization obtained during hot impregnation and under pressure that is usual.

The sulphur content above 20 phr makes it possible to obtain a covering layer material that has a very high modulus (tension modulus at a deformation of 3% of the order of 300 to 1000 MPa) which is very beneficial to grip on snowy ground.

The second test A2 was likewise carried out with a cotton fabric by way of fibre assembly, but with a high Tg compound ME2.

The impregnation conditions were identical to those of the first test, the cotton fabric was placed on the mould side and the ME2 material was prevulcanized during impregnation.

Moulding worked well, as before.

The other three tests were carried out with a baize or a viscose felt by way of fibre assembly and one or two layers of ME2 diene compound by way of impregnation elastomeric material.

The viscose felt used has a density of 0.275. Additional tests carried out with a viscose felt of lower density 0.145 also proved satisfactory as far as the moulding of the covering layer was concerned. It is desirable for this density to be higher than 0.10.

For test A3, the viscose felt was sandwiched between two layers of ME2 compound under identical temperature and pressure conditions and for 11 minutes. That allowed the compound to impregnate the felt well. The final thickness of the covering layer was 1.1 mm.

The moulding operations went well. That indicates that the intrinsic rigidity of the viscose felt was enough to ensure that the covering layer slipped easily without it stretching during the slippage because this layer ended up exactly throughout the cut as indicated.

Test A4 was very similar, the only change being a longer impregnation duration of 20 minutes rather than 11. That appreciably increased the prevulcanization of the elastomeric compound and a greater ease of slippage of the covering layer on the green form of the tread was noted.

For test A5, just one layer of ME2 diene compound was used to impregnate the viscose felt. The duration of the impregnation operation was 9 minutes. The final thickness of the covering layer was of the order of 0.6 mm.

This moulding test likewise went well.

Figure 4:
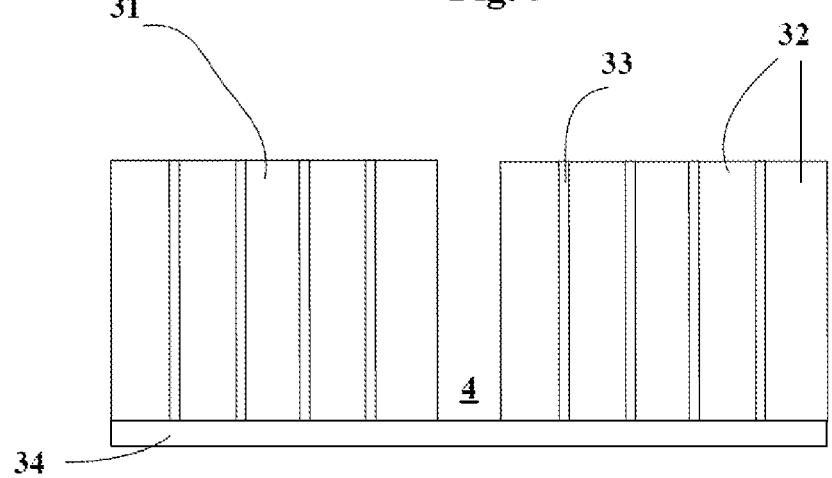
FIG. 4 shows the test specimen of FIG. 3, in side view.

Covering layers similar to those of tests A3, A4 and A5 were also used to produce test specimens similar to those described in FIGS. 3 and 4. Three thicknesses of covering layers were obtained: 1.1 mm, 0.8 mm and 0.5 mm. These test specimens were moulded in such a way that each tread pattern block has one layer of covering material on just one of its edge corners. This edge corner is directed axially.

A control test specimen was produced using by way of base compound a tread composition of "snow" type. The same compound was used as the base compound for the test specimens being tested.

Friction tests against snowy ground were carried out using these test specimens and the results are given in table 3 in terms of relative value. A value of 100 is assigned to the result of the control test specimen, a value greater than 100 indicates a higher coefficient of friction and therefore a better grip performance. A value lower than 100 indicates that the coefficient of friction for that test was below the control value.

The compound ME2 is a compound based on an SBR with a very high glass transition temperature Tg=−12° C. The composition has a dynamic shear modulus G* of the order of 275 MPa at a temperature of −10° C., giving the edge corners of the test specimens very high rigidity as this very low temperature. This composition also has a dynamic shear modulus that is far lower at a temperature of 60° C., below 0.4 MPa.

TABLE 3

|  | Tread block test specimen | | | |
|---|---|---|---|---|
|  | Control | A3 | A4 | A5 |
| Thickness of the covering layer (mm) | — | 1.1 | 0.8 | 0.5 |
| Coefficient of friction | 100 | 110 | 106 | 104 |

The results obtained indicate the full benefit of a covering layer made of a material that has a high modulus at a low temperature. It may also be seen that the thicker the covering layer, the more pronounced the effect this high rigidity covering layer has.

The invention claimed is:

1. A tread for a pneumatic tyre, the tread comprising:
a plurality of tread pattern elements, each tread pattern element including lateral faces and a contact face that is intended to come into contact with a road surface when the tyre is being driven thereon, a boundary between the contact face and the lateral faces forming at least one edge corner; and
a plurality of cuts forming grooves and sipes, the cuts being delimited by opposing lateral faces of the tread pattern elements,
wherein each tread pattern element is formed of at least one base compound, the base compound being a first rubber compound,
wherein the tread includes first and second tread pattern elements separated by a groove, the first tread pattern element including a first contact face, a first lateral face, and a first sipe, the second tread pattern element including a second contact face, a second lateral face, and a second sipe, wherein the first lateral face and the second lateral face oppose each other to delimit the groove therebetween, wherein, when a cross section of the tread is viewed in a plane normal to an axis of rotation of the tyre and passing through the first and second contact faces and the first and second lateral faces, the groove is covered at least in part with a covering layer containing a woven or nonwoven fibre assembly, the covering layer being formed of a material different from the base compound, wherein, when the tread is viewed in the cross section, the groove is disposed between the first sipe and the second sipe, and wherein the base compound is exposed on an entirety of each of the first contact face, the second contact face, opposing lateral faces that delimit the first sipe, and opposing lateral faces that delimit the second sipe.

2. The tread according to claim 1, wherein
the covering layer includes an elastomeric material, and
the fibre assembly is impregnated with the elastomeric material.

3. The tread according to claim 2, wherein an apparent density of the fibre assembly prior to impregnation with an elastomeric material is less than 0.4, with less than 0.25 being preferable for the apparent density of the fibre assembly.

4. The tread according to claim 2, wherein the elastomeric material includes a composition based on at least one diene elastomer.

5. The tread according to claim 4, wherein the at least one diene elastomer is selected from a group of elastomers consisting of: polybutadienes, natural rubber, synthetic polyisoprenes, butadiene copolymers, isoprene copolymers, and blends thereof.

6. The tread according to claim 4, wherein the composition includes sulphur.

7. The tread according to claim 6, wherein a sulphur content of the composition is higher than 20 parts per hundred parts rubber.

8. The tread according to claim 2, wherein the elastomeric material is based on at least one thermoplastic elastomer, the at least one thermoplastic elastomer being a block copolymer that includes at least one elastomer block and at least one thermoplastic block.

9. The tread according to claim 8, wherein the at least one elastomer block of the block copolymer is or are selected from elastomers having a glass transition temperature below 25° C.

10. The tread according to claim 8, wherein the at least one elastomer block of the block copolymer is or are selected from a group consisting of: ethylene elastomers, diene elastomers, and blends thereof.

11. The tread according to claim 10, wherein the at least one elastomer block of the block copolymer include a diene elastomer derived from isoprene, or butadiene, or a blend of isoprene and butadiene.

12. The tread according to claim 8, wherein the at least one thermoplastic block of a block copolymer is or are selected from polymers having a glass transition temperature higher than 80° C. and, if the at least one thermoplastic block includes a semicrystalline thermoplastic block, a melting point higher than 80° C.

13. The tread according to claim 8, wherein the at least one thermoplastic block of the block copolymer is or are selected from a group consisting of: polyolefins, polyurethanes, polyamides, polyesters, polyacetals, polyethers, phenylene polysulphides, polyfluorides, polystyrenes, polycarbonates, polysulfones, polymethylmethacrylate, polyetherimide, thermoplastic copolymers, and blends thereof.

14. The tread according to claim 8, wherein the at least one thermoplastic block or blocks of the block copolymer is or are selected from polystyrenes.

15. The tread according to claim 8, wherein the at least one thermoplastic elastomer is or are selected from a group of thermoplastic elastomers consisting of: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS), and blends of such copolymers.

16. The tread according to claim 8, wherein the fibre assembly is impregnated with a material that includes at least one plasticizer.

17. The tread according to claim 2, wherein a dynamic shear modulus $G^*$ of the elastomeric material, when subjected to an alternating maximum stress of 0.7 MPa at a frequency of 10 Hz and a temperature of $-10°$ C., is greater than 100 MPa, with greater than 200 MPa being preferable for the dynamic shear modulus $G^*$ of the elastomeric material.

18. The tread according to claim 1, wherein fibres of the fibre assembly are long fibres having a length in excess of 50 mm.

19. The tread according to claim 1, wherein the fibre assembly is a two-dimensional assembly of fibres.

20. The tread according to claim 19, wherein the two-dimensional assembly is a nonwoven fibre assembly.

21. The tread according to claim 19, wherein the two-dimensional assembly is a woven fibre assembly.

22. The tread according to claim 1, wherein the fibre assembly is a three-dimensional assembly of long fibres having a length in excess of 50 mm.

23. The tread according to claim 22, wherein the three-dimensional fibre assembly is a felt.

24. The tread according to claim 1, wherein fibres of the fibre assembly are selected from a group of fibres that includes: textile fibres, mineral fibres, and blends thereof.

25. The tread according to claim 24, wherein the fibres include fibres selected from a group of fibres that includes: silk fibres, cotton fibres, and wool fibres.

26. The tread according to claim 24, wherein the fibres are long fibres having a length in excess of 50 mm and include fibres selected from a group that includes: cellulose fibres, polyamide fibres, aramid fibres, polyethylene fibres, polypropylene fibres, polyacrylonitrile fibres, polyimide fibres, polysulfone fibres, polyether sulfone fibres, polyurethane fibres, polyvinyl alcohol fibres, polyester fibres, and polyvinyl chloride fibres.

27. The tread according to claim 26, wherein the polyester fibres include fibres selected from a group that includes: polyethylene terephthalate fibres, polybutylene terephthalate fibres, and polyethylene naphthalate fibres.

28. The tread according to claim 1, wherein fibres of the fibre assembly are long fibres and include mineral fibres selected from a group of fibres that includes: glass fibres, carbon fibres, and basalt fibres.

29. The tread according to claim 1, wherein a thickness of the covering layer is between 0.4 and 3.5 mm.

30. The tread according to claim 29, wherein the thickness of the covering layer is between 0.4 and 1.0 mm.

31. The tread according to claim 29, wherein the thickness of the covering layer is between 2.0 and 3.0 mm.

32. The tread according to claim 1, wherein the covering layer has a height Hr extending from a bottom of the groove along the first lateral face, the height Hr being at least equal to 4 mm.

33. The tread according to claim 32, wherein, when in a new condition, the covering layer extends as far as an edge corner formed by a boundary between the first contact face and the first lateral face.

* * * * *